US012295054B2

United States Patent
Zong et al.

(10) Patent No.: US 12,295,054 B2
(45) Date of Patent: May 6, 2025

(54) COMMUNICATION METHOD, APPARATUS, AND SYSTEM FOR VOICE SERVICE

(71) Applicant: HUAWEI TECHNOLOGIES CO., LTD., Guangdong (CN)

(72) Inventors: Zaifeng Zong, Nanjing (CN); Shufeng Shi, Xi'an (CN); Zhenyu Tao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 385 days.

(21) Appl. No.: 17/857,973

(22) Filed: Jul. 5, 2022

(65) Prior Publication Data

US 2022/0338085 A1 Oct. 20, 2022

Related U.S. Application Data

(63) Continuation of application No. PCT/CN2020/132381, filed on Nov. 27, 2020.

(30) Foreign Application Priority Data

Jan. 7, 2020 (CN) .......................... 202010014854.0

(51) Int. Cl.
*H04W 36/14* (2009.01)
*H04W 36/00* (2009.01)
(Continued)

(52) U.S. Cl.
CPC ..... *H04W 76/18* (2018.02); *H04W 36/00226* (2023.05); *H04W 36/00695* (2023.05);
(Continued)

(58) Field of Classification Search
CPC .......... H04W 76/18; H04W 36/00226; H04W 36/00695; H04W 36/1443; H04W 36/305;
(Continued)

(56) References Cited

U.S. PATENT DOCUMENTS 10,986,543 B2 * 4/2021 Li .......................... H04W 60/04
11,432,208 B2 * 8/2022 Li ................... H04W 36/00226
(Continued)

FOREIGN PATENT DOCUMENTS

| CN | 102131232 A | 7/2011 |
| CN | 110366214 A | 10/2019 |

(Continued)

OTHER PUBLICATIONS

Nokia et al., "(TP for SRVCC BL CR for TS 38.300) Correction of SRVCC", 3GPP TSG-RAN WG3#106 R3-197724, Reno, USA, Nov. 18-22, 2019, Total 2 Pages.
(Continued)

*Primary Examiner* — Jay P Patel
(74) *Attorney, Agent, or Firm* — WOMBLE BOND DICKINSON (US) LLP

(57) ABSTRACT

This application provides a communication method, apparatus, and system for a voice service. The method includes: A session management network element determines that a terminal device is to be handed over from a first network to a second network. The session management network element waits until a first moment to send a request message to a mobility management network element in the second network, where the request message is used to request to set up a first bearer for a voice service of the terminal device.

17 Claims, 7 Drawing Sheets

(51) Int. Cl.
*H04W 36/30* (2009.01)
*H04W 36/32* (2009.01)
*H04W 76/18* (2018.01)

(52) U.S. Cl.
CPC ..... *H04W 36/1443* (2023.05); *H04W 36/305* (2018.08); *H04W 36/324* (2023.05)

(58) Field of Classification Search
CPC . H04W 36/324; H04W 4/16; H04W 36/0033; H04W 36/0079
See application file for complete search history.

(56) References Cited

U.S. PATENT DOCUMENTS

| | | | | |
|---|---|---|---|---|
| 11,503,523 | B2* | 11/2022 | Li | H04W 36/08 |
| 2014/0204901 | A1* | 7/2014 | Hedman | H04L 65/1069 370/331 |
| 2015/0350984 | A1 | 12/2015 | Thota et al. | |
| 2019/0037451 | A1 | 1/2019 | Chaponniere et al. | |
| 2019/0098547 | A1 | 3/2019 | Chong et al. | |
| 2019/0191349 | A1 | 6/2019 | Kim et al. | |
| 2019/0335534 | A1* | 10/2019 | Atarius | H04L 65/1016 |
| 2019/0357020 | A1* | 11/2019 | Chandramouli | H04W 8/08 |

FOREIGN PATENT DOCUMENTS

| | | |
|---|---|---|
| EP | 3044992 B1 | 5/2019 |
| EP | 3764690 A1 | 1/2021 |
| WO | WO-2019029228 A1 * 2/2019 ............ H04W 28/02 |
| WO | 2019196649 A1 | 10/2019 |

OTHER PUBLICATIONS

Huawei et al., "SRVCC after EPS Fall back", 3GPP TSG-WG SA2 Meeting #137E e-meeting S2-2001973, Elbonia, Feb. 24 27, 2020, Total 7 Pages.

Telecom Italia et al., "Alignment of IMS Voice Service via EPS Fallback with RAN specifications", SA WG2 Meeting #133 S2-1906390,May 13-17, 2019, Reno, Nevada, USA, Total 5 Pages.

3GPP TS 23.401 V16.5.0 (Dec. 2019)3rd Generation Partnership Project;Technical Specification Group Services and System Aspects;General Packet Radio Service (GPRS) enhancements for Evolved Universal Terrestrial Radio Access Network (E-UTRAN) access(Release 16), Total 436 Pages.

* cited by examiner

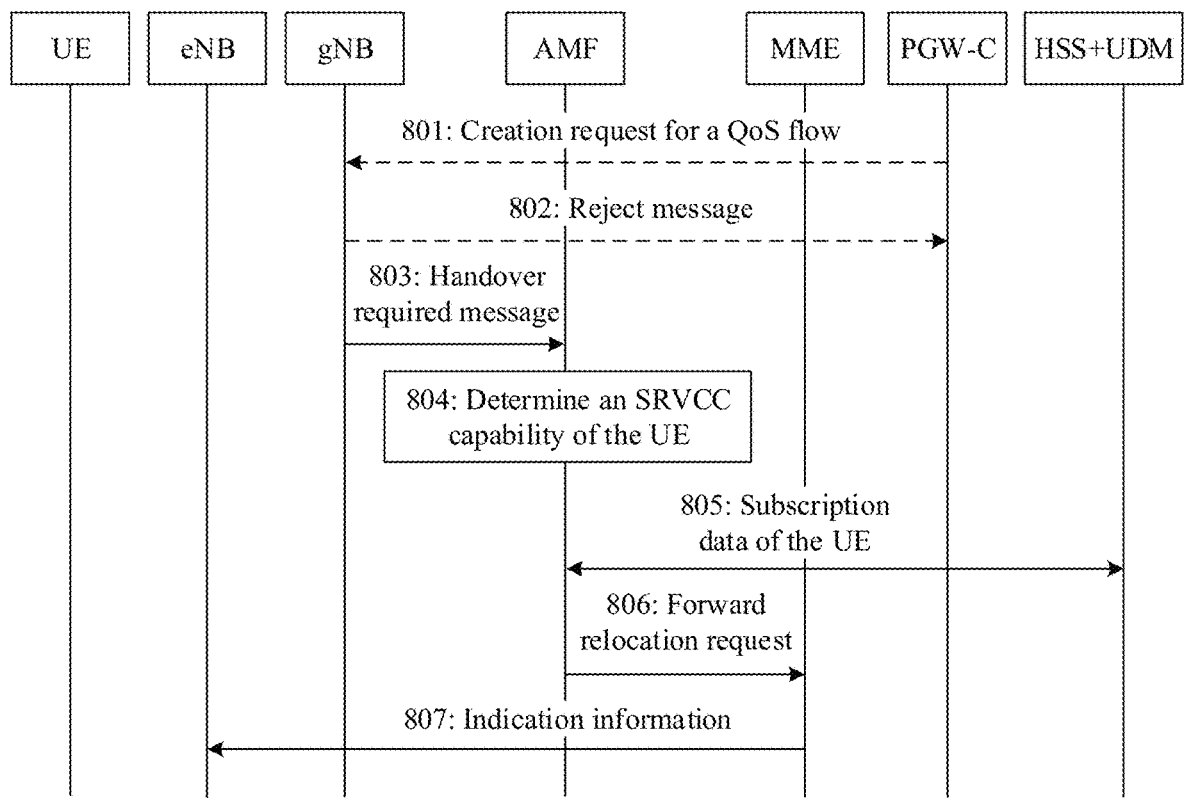

FIG. 8

901: A mobility management network element in a first network determines that a terminal device has a capability of falling back from a second network to a third network to process a voice service 902: The mobility management network element in the first network sends capability information of the terminal device to a mobility management network element in the second network

FIG. 9

COMMUNICATION METHOD, APPARATUS, AND SYSTEM FOR VOICE SERVICE

CROSS-REFERENCE TO RELATED APPLICATIONS

This application is a continuation of International Patent Application No. PCT/CN2020/132381, filed on Nov. 27, 2020, which claims priority to Chinese Patent Application No. 202010014854.0, filed on Jan. 7, 2020. The disclosures of the aforementioned applications are hereby incorporated by reference in their entireties.

TECHNICAL FIELD

This application relates to the field of wireless communication technologies, and in particular, to a communication method, apparatus, and system for a voice service.

BACKGROUND

Currently, 2nd generation mobile communication technology/3rd generation mobile communication technology (2G/3G) networks have been widely deployed in many areas. With rapid development of communication technologies, long term evolution (LTE) networks and the like have covered some urban areas and traffic hotspot areas. In addition, new generation networks, namely, 5th generation mobile communication technology (5G) networks, are also being deployed. Therefore, the 5G, LTE, and 2G/3G networks coexist in these areas in the future. In other words, in a long period of time, inter-system networks (such as the 2G, 3G, LTE, and 5G networks) will coexist to jointly provide services for users. In view of this, inter-system interworking is introduced on a network side. Interworking offers an important guarantee for inter-system service continuity. Owing to the inter-system interworking, operators can implement complementation between the inter-system networks, improve coverage of the existing networks, and improve network quality.

In a scenario of handover from the 5G network to the LTE network, a core network device in the 5G network cannot learn whether a terminal device has a capability of falling back from the LTE network to the 2G/3G network to process a voice service, namely, a single radio voice call continuity (SRVCC) capability. Therefore, the core network device in the 5G network cannot transfer the capability to a core network device in the LTE network in a handover procedure. Consequently, the core network device in the LTE network cannot notify a base station in the LTE network whether the terminal device has the capability of falling back from the LTE network to the 2G/3G network to process the voice service. If the base station in the LTE network does not support the voice service, the base station cannot hand over the terminal device to the 2G/3G network even if a base station in the 2G/3G network with same coverage can process the voice service of the terminal device, causing a call failure of the voice service and affecting user experience.

SUMMARY

This application describes a communication method, apparatus, and system for a voice service.

In an embodiment of this application provides a communication method for a voice service, including:

A mobility management network element in a second network receives a request message from a session management network element, where the request message is used to request to set up a first bearer for a voice service of a terminal device, and the session management network element is used for session management in a first network and the second network. In an embodiment, a mobility management network element in a second network receives information about a first bearer from a mobility management network element in a first network.

The mobility management network element determines, based on the request message, that a service type of the first bearer is the voice service.

Before a first event occurs, the mobility management network element suspends initiation of setup of the first bearer. The first event includes: The mobility management network element sends indication information to an access network element in the second network, where the indication information indicates that a fallback of the voice service of the terminal device from the second network to a third network is supported. In an embodiment, the first event includes: The mobility management network element determines that a fallback of the voice service of the terminal device from the second network to a third network is supported.

In an embodiment, after the mobility management network element in the second network receives the request message from the session management network element, or after the mobility management network element in the second network receives the information about the first bearer from the mobility management network element in the first network, if the service type of the first bearer is the voice service, the mobility management network element suspends the initiation of the setup of the first bearer before sending the indication information to the access network element in the second network or determining that the fallback of the voice service of the terminal device from the second network to the third network is supported, where the request message is used to request to set up the first bearer for the voice service of the terminal device. Such a wait enables the access network element in the second network to learn, when receiving a request for setting up the first bearer, that the fallback of the voice service of the terminal device from the second network to the third network is supported. Therefore, even if the access network element in the second network does not support the voice service, after receiving the request for setting up the first bearer for the voice service, the access network element in the second network may hand over the terminal device to an access network element in the third network with same coverage to process the voice service of the terminal device, to maintain call continuity of the voice service and improve user experience.

For example, the indication information is a single radio voice call continuity SRVCC operation possible indication.

In an embodiment, the method further includes: The mobility management network element receives a tracking area request message from the terminal device, where the tracking area request message carries capability information, and the capability information indicates that the terminal device supports a capability of falling back from the second network to the third network to maintain continuity of the voice service. The mobility management network element determines, based on the capability information, that the fallback of the voice service of the terminal device from the second network to the third network is supported. The mobility management network element sends the indication information to the access network element.

In an embodiment, the method further includes: The mobility management network element sends the capability information to a subscriber data management network element. The mobility management network element obtains subscription information of the terminal device from the subscriber data management network element, where the subscription information indicates that the terminal device has subscribed to the fallback from the second network to the third network to maintain the continuity of the voice service. The mobility management network element sends the capability information to the subscriber data management network element, so that a network element in another domain (for example, an IMS domain) can quickly obtain the capability information from the subscriber data management network element, to improve communication efficiency.

In an embodiment, the method further includes: The mobility management network element sends the indication information to the access network element when the terminal device supports the capability of falling back from the second network to the third network to maintain the continuity of the voice service and has subscribed to the fallback from the second network to the third network to maintain the continuity of the voice service.

In an embodiment, the method further includes: The mobility management network element initiates the setup of the first bearer after or when sending the indication information to the access network element. Therefore, the setup of the first bearer is initiated only after or when the mobility management network element sends the indication information to the access network element, to ensure that the access network element in the second network can learn that the fallback of the voice service of the terminal device from the second network to the third network is supported.

In an embodiment, the method further includes: The mobility management network element rejects the setup of the first bearer if determining that the fallback of the voice service of the terminal device from the second network to the third network is not supported.

In an embodiment of this application provides a communication method for a voice service, including:

A session management network element determines that a terminal device is to be handed over from a first network to a second network, where the session management network element is used for session management in the first network and the second network.

The session management network element waits until a first moment to send a request message to a mobility management network element in the second network, where the request message is used to request to set up a first bearer for a voice service of the terminal device.

In an embodiment, in a scenario in which the terminal device is handed over from the first network to the second network, the session management network element does not immediately request to set up the first bearer for the voice service of the terminal device. The session management network element waits until the first moment to request to set up the first bearer for the voice service of the terminal device. Such a wait enables an access network element in the second network to have a sufficient time period to learn that a fallback of the voice service of the terminal device from the second network to a third network is supported. Therefore, even if the access network element in the second network does not support the voice service, an access network element in the third network with same coverage can process the voice service of the terminal device, to maintain call continuity of the voice service and improve user experience.

In an embodiment, that the session management network element waits until a first moment includes:

The session management network element starts a timer, where the first moment is a moment at which the timer expires.

For example, the timer is used to wait for the terminal device to complete handover from the first network to the second network.

In an embodiment, the timer is used to wait for the session management network element to receive first notification information from the mobility management network element in the second network, where the first notification information indicates that the terminal device is successfully handed over from the first network to the second network.

In an embodiment, the timer is used to wait for the session management network element to receive second notification information from a subscriber data management network element, where the second notification information indicates that the terminal device supports a capability of falling back from the second network to the third network to maintain continuity of the voice service.

Therefore, a timer mechanism can ensure that the access network element in the second network has the sufficient time period to learn that the fallback of the voice service of the terminal device from the second network to the third network is supported.

In an embodiment, the first moment is a moment at which the session management network element receives first notification information from the mobility management network element in the second network, and the first notification information indicates that the terminal device is successfully handed over from the first network to the second network. Therefore, the mobility management network element in the second network notifies the session management network element only after the terminal device is successfully handed over from the first network to the second network, and then the session management network element requests to set up the first bearer for the voice service of the terminal device. In a process in which the terminal device is successfully handed over from the first network to the second network, the mobility management network element in the second network has notified the access network element in the second network that the fallback of the voice service of the terminal device from the second network to the third network is supported. Therefore, the access network element in the third network with same coverage can process the voice service of the terminal device, to maintain the call continuity of the voice service and improve user experience.

In an embodiment, the first moment is a moment at which the session management network element receives second notification information from a subscriber data management network element, and the second notification information indicates that the terminal device supports a capability of falling back from the second network to the third network to maintain continuity of the voice service. Therefore, the subscriber data management network element notifies the session management network element after learning that the terminal device has the capability of maintaining the continuity of the voice service, and then the session management network element requests to set up the first bearer for the voice service of the terminal device. Before the subscriber data management network element learns that the terminal device has the capability of maintaining the continuity of the voice service, the mobility management network element in the second network has notified the access network element in the second network that the fallback of the voice service of the terminal device from the second network to the third network is supported. Therefore, the access network element in the third network with same coverage can process the voice service of the terminal device, to maintain the call continuity of the voice service and improve user experience.

In an embodiment, the method further includes: The session management network element sends a subscription request to the subscriber data management network element, where the subscription request is used to request the subscriber data management network element to send the second notification information to the session management network element after learning, from the mobility management network element in the second network, that the terminal device supports the capability of falling back from the second network to the third network to maintain the continuity of the voice service. For example, the session management network element sends the subscription request to the subscriber data management network element in a session establishment process or in a process in which the session management network element establishes a data transmission channel of the first network for the voice service.

In an embodiment, the method further includes:

The session management network element triggers establishment of the data transmission channel of the first network for the voice service of the terminal device.

The session management network element receives a reject message from an access network element in the first network, where the reject message is used to reject the establishment of the data transmission channel for the voice service, the reject message includes first indication information, the first indication information indicates that the access network element initiates handover of the terminal device from the first network to the second network through a first interface, and the first interface is an interface between a mobility management network element in the first network and the mobility management network element in the second network.

In an embodiment, the method further includes:

The session management network element receives a context request message from a mobility management network element in the first network, where the context request message includes second indication information, and the second indication information indicates to hand over the terminal device from the first network to the second network.

In an embodiment, the method further includes:

If the session management network element receives the first indication information or the second indication information, the session management network element skips sending information about the first bearer to the mobility management network element in the first network.

In an embodiment of this application provides a communication method for a voice service, including:

A mobility management network element in a second network receives capability information from a terminal device, where the capability information indicates that the terminal device supports a capability of falling back from the second network to a third network to maintain continuity of a voice service.

The mobility management network element sends indication information to an access network element in the second network, where the indication information indicates that fallback of the voice service of the terminal device from the second network to the third network is supported.

The mobility management network element sends first notification information to a session management network element after sending the indication information, where the first notification information indicates that the terminal device is successfully handed over from a first network to the second network.

In an embodiment, in a scenario in which the terminal device is handed over from the first network to the second network, the mobility management network element in the second network notifies the session management network element only after the terminal device is successfully handed over from the first network to the second network, and then the session management network element requests to set up a first bearer for the voice service of the terminal device. In a process in which the terminal device is successfully handed over from the first network to the second network, the mobility management network element in the second network has notified the access network element in the second network that the fallback of the voice service of the terminal device from the second network to the third network is supported. Therefore, after the access network element in the second network receives a request for setting up the first bearer for the voice service, if not supporting the voice service, the access network element in the second network may hand over the terminal device to an access network element in the third network with same coverage to process the voice service of the terminal device, to maintain call continuity of the voice service and improve user experience.

For example, the indication information is a single radio voice call continuity SRVCC operation possible indication.

In an embodiment, the method further includes:

The mobility management network element sends the capability information to a subscriber data management network element.

The mobility management network element obtains subscription information of the terminal device from the subscriber data management network element, where the subscription information indicates that the terminal device has subscribed to the fallback from the second network to the third network to maintain the continuity of the voice service.

In an embodiment of this application provides a communication method for a voice service, including:

A subscriber data management network element receives capability information of a terminal device from a mobility management network element in a second network, where the capability information indicates that the terminal device supports a capability of falling back from the second network to a third network to maintain continuity of a voice service.

The subscriber data management network element sends second notification information to a session management network element, where the second notification information indicates that the terminal device supports the capability of falling back from the second network to the third network to maintain the continuity of the voice service, and the session management network element is used for session management in a first network and the second network.

In an embodiment, in a scenario in which the terminal device is handed over from the first network to the second network, the subscriber data management network element notifies the session management network element after learning that the terminal device has the capability of maintaining the continuity of the voice service, and then the session management network element requests to set up a first bearer for the voice service of the terminal device. Before the subscriber data management network element learns that the terminal device has the capability of maintaining the continuity of the voice service, the mobility management network element in the second network has notified an access network element in the second network that a fallback of the voice service of the terminal device from the second network to the third network is supported. Therefore, after the access network element in the second network receives a request for setting up the first bearer for the voice service, if not supporting the voice service, the access network element in the second network may hand over the terminal device to an access network element in the third network with same coverage to process the voice service of the terminal device, to maintain call continuity of the voice service and improve user experience.

In an embodiment, the method further includes:

The subscriber data management network element receives a subscription request from the session management network element, where the subscription request is used to request the subscriber data management network element to send the second notification information to the session management network element after learning, from the mobility management network element in the second network, that the terminal device supports the capability of falling back from the second network to the third network to maintain the continuity of the voice service.

In an embodiment of this application provides a communication method for a voice service, including:

A mobility management network element in a first network determines that a terminal device has a capability of falling back from a second network to a third network to process a voice service.

The mobility management network element in the first network sends capability information of the terminal device to a mobility management network element in the second network, where the capability information indicates that the terminal device supports the capability of falling back from the second network to the third network to maintain continuity of the voice service. For example, the mobility management network element in the first network sends the capability information of the terminal device to the mobility management network element in the second network by using a forward relocation request message or a context response message.

In an embodiment, the mobility management network element in the first network can determine that the terminal device has the capability of falling back from the second network to the third network to process the voice service, and sends the capability information of the terminal device to the mobility management network element in the second network. Therefore, the mobility management network element in the second network can learn that the terminal device supports the capability of falling back from the second network to the third network to maintain the continuity of the voice service, and may send indication information to an access network element in the second network when or before requesting the access network element in the second network to set up a bearer for the voice service, where the indication information indicates that a fallback of the voice service of the terminal device from the second network to the third network is supported. In this way, even if the access network element in the second network does not support the voice service, after receiving a request for setting up the first bearer for the voice service, the access network element in the second network may hand over the terminal device to an access network element in the third network with same coverage to process the voice service of the terminal device, to maintain call continuity of the voice service and improve user experience.

In an embodiment, the mobility management network element in the first network determines, based on an IMEI of the terminal device, whether the terminal device supports the capability of falling back from the second network to the third network to process the voice service.

In an embodiment, the mobility management network element in the first network determines that a voice centric terminal device has the capability of falling back from the second network to the third network to process the voice service.

In an embodiment, the method further includes: The mobility management network element in the first network sends the capability information to a subscriber data management network element. The mobility management network element sends the capability information to the subscriber data management network element, so that a network element in another domain (for example, an IMS domain) can quickly obtain the capability information from the subscriber data management network element, to improve communication efficiency.

In an embodiment, the method further includes: The mobility management network element in the first network obtains subscription information of the terminal device from the subscriber data management network element, where the subscription information indicates that the terminal device has subscribed to the fallback from the second network to the third network to maintain the continuity of the voice service.

In an embodiment, the method further includes: The mobility management network element in the first network (a 5G network) sends the subscription information to the mobility management network element in the second network. For example, the mobility management network element in the first network (the 5G network) sends the subscription information to the mobility management network element in the second network by using the forward relocation request message or the context response message.

In an embodiment of this application provides a communication method for a voice service, including:

A first access network element in a first network configures capability information of a second access network element in a second network, where the capability information indicates whether the second access network element supports a capability for a voice service, the second access network element is a neighboring access network element of the first access network element, for example, is an E-UTRAN, and the second network is correspondingly a 4G network.

The first access network element receives a request message for establishing a transmission channel corresponding to the voice service, or determines that a corresponding transmission channel has been established for the voice service.

The first access network element determines, based on the capability information of the second access network element, whether to hand over or redirect a terminal device to the second access network element.

In an embodiment, if the first access network element in the first network receives the request message for establishing the transmission channel corresponding to the voice service, or determines that the corresponding transmission channel has been established for the voice service, the first access network element in the first network can determine, based on the capability information of the second access network element, whether to hand over or redirect the terminal device to the second access network element. In this way, regardless of whether the access network element in the second network supports the voice service, the capability information of the second access network element is considered for handover or redirection, to maintain call continuity of the voice service and improve user experience.

In an embodiment, the method further includes: When the second access network element supports the voice service, the first access network element hands over or redirects the terminal device to the second access network element. For example, when the second access network element and a third access network element in a third network exist in a co-coverage area of the first access network element, and the second access network element supports the voice service, the first access network element hands over or redirects the terminal device to the second access network element according to a configured preference policy. The third network is a 2G or 3G network. In this way, the terminal device is preferably handed over or redirected to the second access network element, so that continuity of a data service can be supported while continuity of the voice service is supported, and the data service of the terminal device is not interrupted when the terminal device is handed over to the third network.

In an embodiment, the method further includes: When the second access network element does not support the voice service, if a third access network element in a third network exists in a co-coverage area of the first access network element, and the terminal device supports a fallback from the first network to the third network to maintain continuity of the voice service, the first access network element hands over or redirects the terminal device to the third access network element, where the third access network element is a neighboring access network element of the second access network element. In this way, even if the access network element in the second network does not support the voice service, the access network element in the third network with same coverage can process the voice service of the terminal device, to maintain the call continuity of the voice service and improve user experience.

In an embodiment of this application provides a communication apparatus for a voice service. The communication apparatus has a function of implementing behavior of the mobility management network element/session management network element/subscriber data management network element/access network element in the foregoing methods. The function may be implemented by hardware, or may be implemented by hardware executing corresponding software. The hardware or the software includes one or more modules corresponding to the foregoing functions. In an embodiment, a structure of the communication apparatus includes a processor and a transceiver. The processor is configured to support the mobility management network element/session management network element/subscriber data management network element/access network element to perform a corresponding function in the foregoing methods. The transceiver is configured to implement communication between the mobility management network element/session management network element/subscriber data management network element/access network element and another network element. The communication apparatus may further include a memory. The memory is configured to be coupled to the processor, and stores program instructions and data that are necessary for the mobility management network element/session management network element/subscriber data management network element/access network element.

In an embodiment of this application provides a computer-readable storage medium. The computer-readable storage medium stores instructions. When the instructions are run on a computer, the computer is enabled to perform the methods in the foregoing aspects.

In an embodiment of this application provides a computer program product including instructions. When the computer program product runs on a computer, the computer is enabled to perform the methods in the foregoing aspects.

In an embodiment, the application provides a chip system. The chip system includes a processor, configured to support the mobility management network element/session management network element/subscriber data management network element/access network element to implement a function in the foregoing aspects, for example, generate or process information in the foregoing methods. In an embodiment, the chip system further includes a memory. The memory is configured to store program instructions and data that are necessary for a data sending device. The chip system may include a chip, or may include a chip and another discrete component.

BRIEF DESCRIPTION OF DRAWINGS

The following briefly describes accompanying drawings used in describing embodiments.

FIG. 8 is a signaling exchange diagram of a communication method for a voice service according to still another embodiment of the present disclosure;

FIG. 9 is a schematic flowchart of a communication method for a voice service according to still another embodiment of the present disclosure;

DESCRIPTION OF EMBODIMENTS

The following clearly describes technical solutions in embodiments of this application with reference to the accompanying drawings in embodiments of this application.

Figure 1:
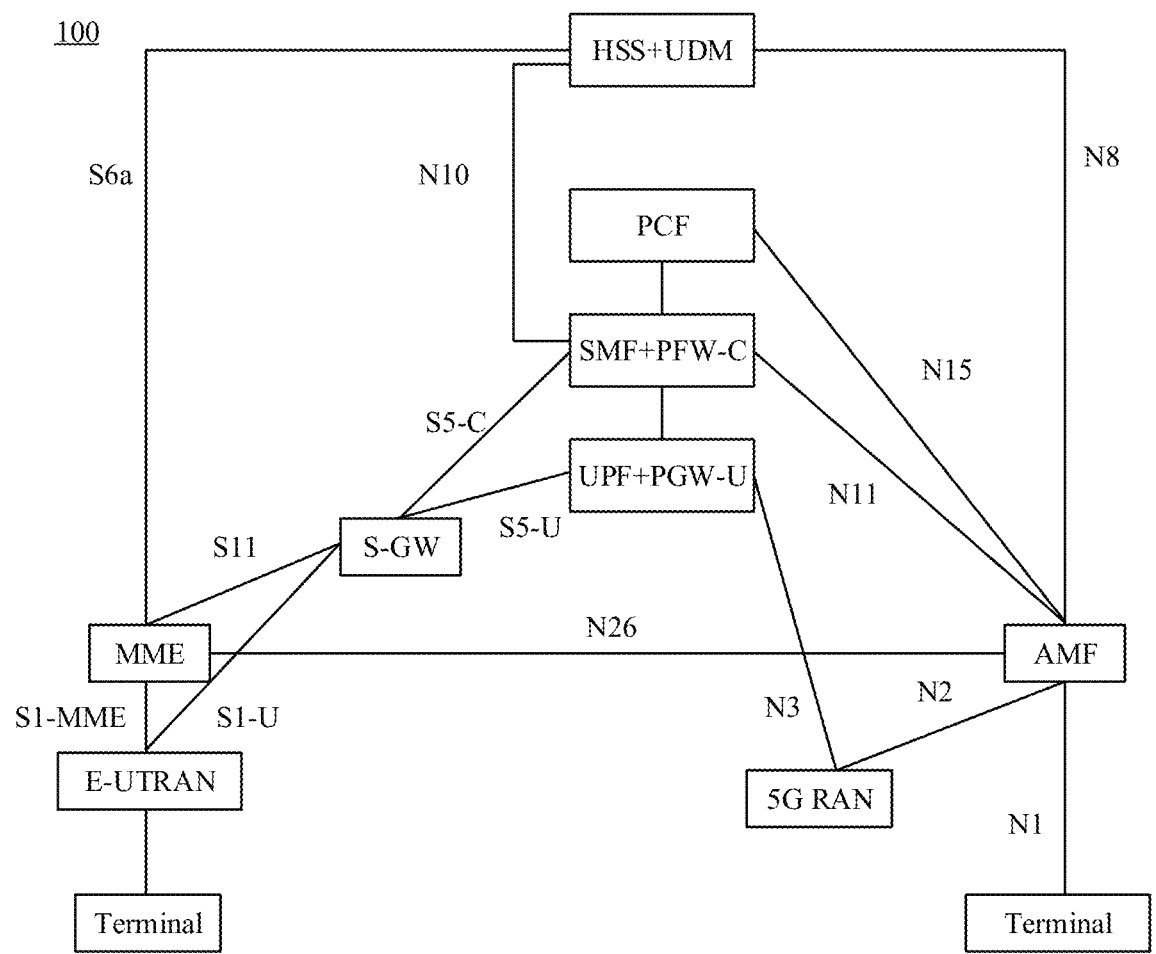
FIG. 1 is a schematic diagram of an architecture that is in a non-roaming scenario of interworking between a 5G system and a 4G system and to which an embodiment of this application is applicable.

FIG. 1 is a schematic diagram of a system architecture 100 according to an embodiment of this application. FIG. 1 shows the interworking system architecture 100 between a 4G network and a 5G network in a non-roaming scenario.

In an embodiment, the system architecture 100 may include network elements in the 4G network and network elements in the 5G network. Some modules in the system architecture 100 include functions of the network element in the 4G network and the network element in the 5G network. For example, the modules include a user plane function (UPF)+packet data network (PDN) gateway user plane function (PGW-U) module, a session management function (SMF)+PDN gateway control plane function (PGW-C) module, and a home subscriber server (HSS)+unified data management (UDM) module.

The UPF+PGW-U module is used for user data transmission management. In the interworking system architecture, the module can not only be used for 4G data transmission, but also provide a 5G data transmission function.

The SMF+PGW-C module is used for session establishment, deletion, and modification management. In the interworking system architecture, the module can provide both a 4G session management function and a 5G session management function.

The HSS+UDM module is configured to store subscription data of a user. In the interworking system architecture, the module stores both 4G subscription information and 5G subscription information of a terminal.

It should be understood that "+" represents integrated configuration. A UPF is a user plane function in the 5G network, and a PGW-U is a gateway user plane function that is in the 4G network and that corresponds to the UPF. An SMF is a session management function in the 5G network, and a PGW-C is a gateway control plane function that is in the 4G network and that corresponds to the SMF. The "integrated configuration" herein means that one module may have functions of two network function entities.

In addition, the system architecture 100 may further include an MME module, a serving gateway (S-GW) module, and an access and mobility management function (AMF) module and a policy control function (PCF) module that are in the 5G network.

The MME module is used for mobility management of the user. For example, the mobility management mainly includes attachment management, accessibility management, mobility management, paging management, access authentication and authorization, and non-access stratum signaling encryption and integrity protection of the user.

The S-GW module is a user plane gateway, and is a user plane termination point of an evolved universal terrestrial radio access network (E-UTRAN). The S-GW module manages data packet routing and transmission, adds a packet tag of a transport layer, and so on.

The AMF module is used for access and mobility management of the user, where the access and mobility management mainly includes registration management, the accessibility management, the mobility management, the paging management, the access authentication and authorization, the non-access stratum signaling encryption and integrity protection, and the like of the user.

The PCF module is used for policy and charging control. In the interworking system architecture, the module provides a policy and charging control rule.

The terminal accesses the 4G network through the E-UTRAN, and accesses the 5G network through a next generation radio access network (NG-RAN).

The NG-RAN is configured to provide the terminal with a 5G radio air interface to access a core network, to obtain a corresponding service.

The E-UTRAN is configured to provide the terminal with a 4G radio air interface to access the core network, to obtain a corresponding service.

The following describes communication interfaces between the foregoing modules in the system architecture 100.

An S1-MME interface is a control plane interface between the MME and the E-UTRAN.

An S1-U interface is a user plane interface between the S-GW and the E-UTRAN.

An S5-U interface is a user plane interface between the S-GW and the PGW-U, and is configured to transmit user plane data of UE.

An S5-C interface is a control plane management interface between the S-GW and the PGW-U, and is configured to establish a user plane connection between the S-GW and the PGW-U for the UE.

An S6a interface is an interface between the MME and an HSS, and is configured to obtain the subscription data of the user and perform an authentication and authorization function for the UE.

An S11 interface is an interface between the S-GW and the MME, and is configured to establish a user plane bearer.

An N1 interface is an interface between the UE and the AMF, and is used for non-access stratum signaling management and transmission.

An N2 interface is an interface between the NG-RAN and the AMF, and is used for signaling transmission.

An N3 interface is an interface between the UPF and the NG-RAN, and is configured to transmit data of the user.

An N4 interface is an interface between the SMF and the UPF, and is configured to establish a user plane transmission channel.

An N7 interface is an interface between the SMF and the PCF, and is configured to formulate and deliver policy control and charging information.

An N8 interface is an interface between the AMF and a UDM, and is configured to obtain mobility-related subscription information of the user and the like.

An N10 interface is an interface between the SMF and the UDM, and is configured to obtain session management-related subscription information of the user and the like.

An N11 interface is an interface between the SMF and the AMF, and is used for transmission of session management information and the like.

An N15 interface is an interface between the AMF and the PCF, and is configured to obtain access and mobility-related policy information.

In the system architecture 100, a first interface is introduced to support interworking between the 4G network and the 5G network. The first interface is a communication interface between the AMF in the 5G network and the MME in the 4G network, and may be represented by an N26 interface. The system architecture optionally supports the N26 interface. A handover procedure can be used only in an interworking system architecture that supports the N26 interface, to ensure service continuity.

It should be further understood that in an embodiment of this application, the system architecture 100 supports the N26 interface.

It should be noted that in the system architecture 100, names of the interfaces between the modules are merely examples, and the interfaces may have other names in an embodiment. This is not limited in an embodiment of this application.

It should be further noted that, in the system architecture 100, the E-UTRAN in the 4G network or the NG-RAN in the 5G network may also be referred to as an access network element. The access network element is a device that accesses the core network, for example, may be a base station, a broadband network gateway (BNG), an aggregation switch, or a non-3GPP access device. The base station may be in various forms, for example, may be a macro base station, a micro base station (also referred to as a small cell), a relay station, or an access point. This is not limited in embodiments of this application. The following provides description by using an example in which the NG-RAN is a 5G NodeB (gNB) and the E-UTRAN is an evolved NodeB (eNB).

Certainly, in the system architecture 100, the 4G network and the 5G network may further include other modules. For example, the 4G network may further include a serving general packet radio system (GPRS) support node (SGSN) module, and the 5G network may further include an authentication server function (AUSF) module and a network slice selection function (NSSF) module. This is not limited in an embodiment of this application.

The terminal in embodiments of this application may include a handheld device, a vehicle-mounted device, a wearable device, and a computing device that have a wireless communication function, or another processing device connected to a wireless modem, and may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, user equipment (UE), a mobile station (MS), a terminal device, and the like. For ease of description, all the foregoing devices are collectively referred to as the terminal in embodiments of this application.

In the following description, a first network may be a 5G network in a scenario of interworking between the 5G system and a 4G system, namely, a network including the NG-RAN, the AMF, the SMF, and the UPF in FIG. 1. A second network is the 4G network in the scenario of the interworking between the 5G system and the 4G system, namely, a network including the UE, the E-UTRAN, the MME, the S-GW, the PGW-C, and the PGW-U in FIG. 1. A third network is a 2G/3G network. In addition, the first network may further include another network element in the 5G system, and the second network may further include another network element in the 4G system. This is not limited in the present disclosure.

For ease of description, the foregoing "SMF+PGW-C module" is simplified as the PGW-C for description.

This application provides four solutions. It should be noted that the four solutions may alternatively be used in combination.

Figure 2:
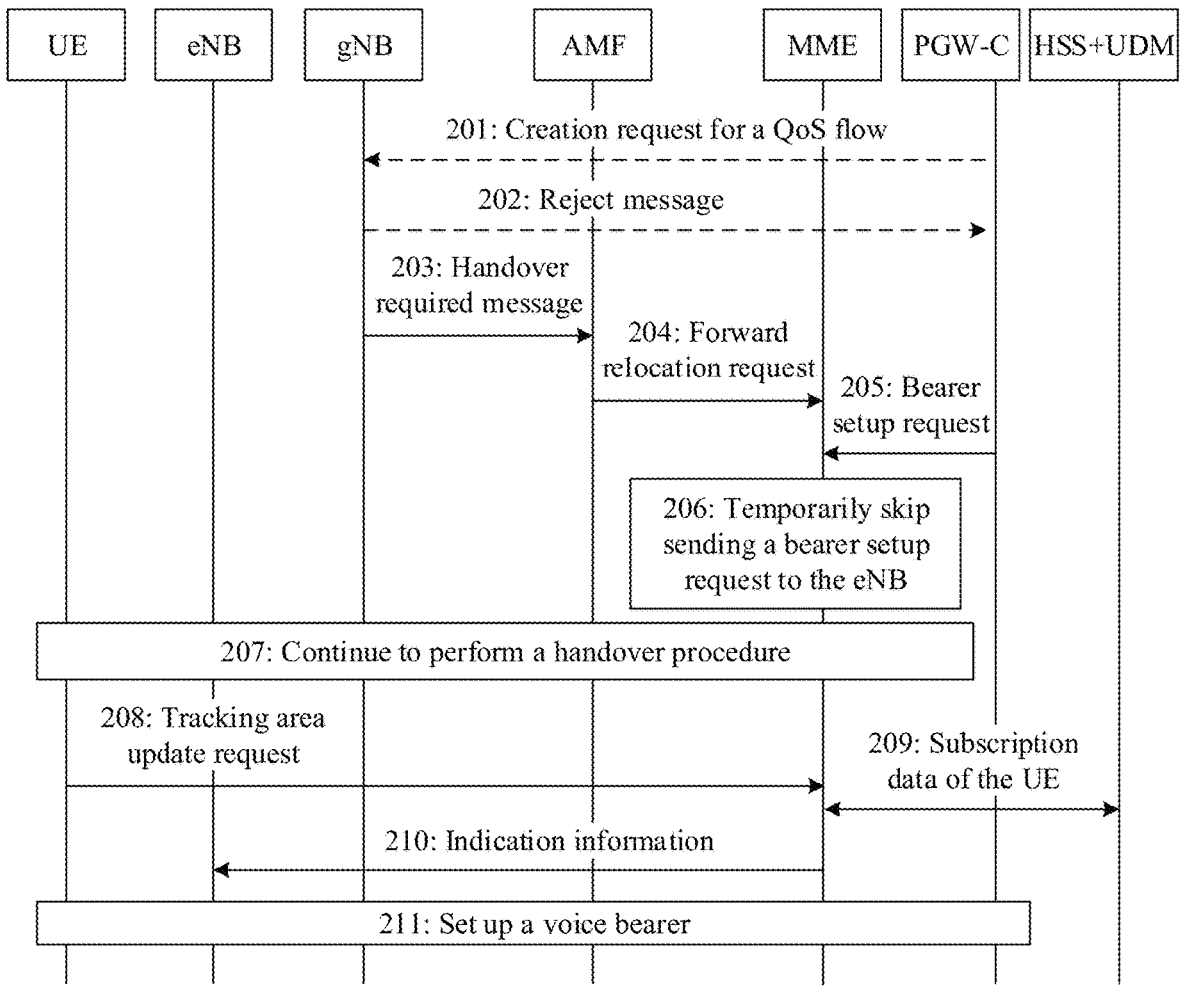
FIG. 2 is a signaling exchange diagram of a communication method for a voice service according to an embodiment of the present disclosure.

For a first solution, the following describes a communication method for a voice service according to an embodiment of this application with reference to FIG. 2. The method includes the following operations.

Operation 201: A PGW-C triggers creation of a quality of service (QoS) flow for a voice service.

For example, the PGW-C may receive a policy and charging control (PCC) rule corresponding to the voice service, and the PGW-C determines to create a new QoS flow for the voice service, and sends a creation request for the QoS flow to a gNB.

For example, if the voice service is an Internet protocol (IP) multimedia subsystem (IMS) voice service, in a 5G network, the PGW-C usually sets a 5G QoS identifier (5QI) of the QoS flow corresponding to the voice service to 1.

Operation 202: When receiving the creation request for the QoS flow, the gNB rejects the creation of the QoS flow if not supporting the QoS flow.

For example, the gNB may set: The creation of the QoS flow with the 5QI=1 is not supported. If determining that the 5QI corresponding to the QoS flow is not supported, the gNB rejects the creation of the QoS flow, and sends a reject message to the PGW-C.

Operation 203: The gNB sends a handover required message to an AMF.

For example, after rejecting the creation of the QoS flow, the gNB may initiate the handover required message, to hand over UE to an eNB that supports the voice service, so that the voice service can continue to be processed.

The gNB sends the handover required message to the AMF, where the handover required message may carry information about an eNB selected by the gNB, to hand over the UE to the eNB.

Operation 204: The AMF sends a forward relocation request to an MME.

For example, the AMF selects the MME based on the information about the eNB, and sends the forward relocation request to the MME. After receiving the forward relocation request, the MME initiates 5G-to-4G handover.

If the gNB supports the voice service and an IMS call has been initiated, when the UE is in the 5G network, a corresponding QoS flow has been created for the IMS voice service, and a corresponding bearer identifier (namely, an evolved packet system bearer ID, EBI) has been allocated to the IMS voice service. In this case, a PDN connection context sent by the AMF to the MME includes a bearer context corresponding to the IMS voice service.

Operation 205: The PGW-C sends a bearer setup request to the MME.

In a handover procedure, the MME may receive the bearer setup request sent by the PGW-C to set up a bearer for the voice service. The bearer corresponds to the QoS flow in operation 201. If the voice service is the IMS voice service, a QCI of the bearer is usually set to 1.

The handover procedure does not end until a tracking area update (TAU) procedure is completed. Before tracking area update, the MME cannot obtain SRVCC capability information of the terminal device, and cannot send an SRVCC operation possible indication to the eNB when sending a handover request to the eNB. Then, in the tracking area update procedure, because the MME sends no message to the PGW-C, the PGW-C does not know when the TAU procedure ends. Therefore, the PGW-C may send the bearer setup request to the MME before the handover procedure is completed.

Operation 206: The MME temporarily skips sending a bearer setup request to the eNB.

In an embodiment, although the MME receives the bearer setup request from the PGW-C, if determining that the bearer setup request is used to set up the bearer for the voice service, the MME temporarily does not send the bearer setup request to the eNB. For example, the MME may determine a type of the bearer based on the QCI of the bearer. For example, the QCI=1 indicates that the bearer is set up for the IMS voice service. Based on this, the MME may temporarily not send the bearer setup request to the eNB.

In an embodiment, if a bearer context received by the MME from the AMF includes the bearer context corresponding to the IMS voice service, when the MME sends the handover request to the eNB, the handover request may not include information about the bearer, that is, setup of the bearer is suspended. For example, the QCI of the bearer corresponding to the IMS voice service is set to 1, and the MME may determine, based on the QCI, that the bearer is the bearer corresponding to the IMS voice service.

Operation 207: Continue to perform the handover procedure.

The MME continues to perform the subsequent handover procedure until the UE is handed over to a 4G network. In this case, the MME waits for a tracking area update request sent by the UE.

Operation 208: The UE sends the tracking area update request to the MME.

If the UE supports 4G-to-2G/3G SRVCC, the UE includes capability information in the TAU request message. The capability information indicates that the UE supports a capability of falling back from the 4G network to a 2G/3G network to maintain continuity of the voice service. For example, the capability information may be an SRVCC capability of falling back from the 4G network to the 2G/3G network.

Operation 209: The MME obtains subscription data of the UE from an HSS+UDM.

The subscription data may also be referred to as subscription information. The subscription information indicates whether the UE has subscribed to a fallback from the 4G network to the 2G/3G network to maintain the continuity of the voice service. For example, the MME determines, based on the received subscription information, whether the UE has subscribed to the SRVCC.

In an embodiment, in this operation, the MME further sends the SRVCC capability of the UE to the HSS+UDM.

Operation 210: The MME sends indication information to the eNB.

The indication information indicates that handover of the voice service of the UE from the 4G network to the 2G/3G network is supported. For example, the indication information is the SRVCC operation possible indication.

For example, the MME determines, depending on whether the UE supports the capability of falling back from the 4G network to the 2G/3G network to maintain the continuity of the voice service, whether the UE has subscribed to the fallback from the 4G network to the 2G/3G network to maintain the continuity of the voice service, and whether the MME supports the fallback from the 4G network to the 2G/3G network to maintain the continuity of the voice service, whether the handover of the voice service of the UE from the 4G network to the 2G/3G network is supported (which may also be understood as whether there is a possibility of handing over the voice service of the UE from the 4G network to the 2G/3G network, in other words, whether the handover of the voice service of the UE from the 4G network to the 2G/3G network is allowed). When the UE supports the capability of falling back from the 4G network to the 2G/3G network to maintain the continuity of the voice service, the UE has subscribed to the fallback from the 4G network to the 2G/3G network to maintain the continuity of the voice service, and the MME supports the fallback from the 4G network to the 2G/3G network to maintain the continuity of the voice service, the MME determines that the handover of the voice service of the UE from the 4G network to the 2G/3G network is supported. When the UE does not support the capability of falling back from the 4G network to the 2G/3G network to maintain the continuity of the voice service, the UE has not subscribed to the fallback from the 4G network to the 2G/3G network to maintain the continuity of the voice service, or a network does not support the fallback from the 4G network to the 2G/3G network to maintain the continuity of the voice service, the MME determines that the handover of the voice service of the UE from the 4G network to the 2G/3G network is not supported.

When determining that the handover of the voice service of the UE from the 4G network to the 2G/3G network is supported, the MME sends the SRVCC operation possible indication to the eNB, to indicate to the eNB that the UE can support the SRVCC.

For example, the MME may send a UE context modification request message to the eNB, where the UE context modification request message carries the SRVCC operation possible indication. In an embodiment, the MME may send the SRVCC operation possible indication in a downlink non-access stratum (NAS) transport message of a tracking area update response message.

Operation 211: The MME triggers the setup of the voice bearer.

The MME receives, in operation 205, the bearer setup request sent by the PGW-C, and temporarily does not send the bearer setup request to the eNB in operation 206. After operation 210, that is, after the MME sends the SRVCC operation possible indication to the eNB, the MME may send the bearer setup request to the eNB, to set up the corresponding bearer. In an embodiment, the MME may alternatively send the SRVCC operation possible indication together with the bearer setup request to the eNB.

Therefore, in an embodiment, after the eNB receives the bearer setup request, if the eNB does not support the bearer, the eNB learns that the SRVCC may be triggered to hand over the UE to the 2G/3G network because the eNB has received the SRVCC operation possible indication or has received the indication together with the bearer setup request, so that the voice service continues to be processed in the 2G/3G network based on the SRVCC. The method avoids a voice service failure that is caused because the eNB does not receive the SRVCC operation possible indication during the setup of the voice bearer and consequently the SRVCC to the 2G/3G network is not triggered.

The embodiment in FIG. 2 provides a method for supporting SRVCC during an EPS fallback, to resolve a conventional-technology problem of failing to process a voice service, where the problem occurs in the following case: When UE initiates a voice call, because a gNB does not support the voice service, the UE falls back to a 4G network; when an eNB does not support the voice service either, SRVCC cannot be initiated, and consequently the UE cannot be migrated to a 2G/3G network with same coverage to continue the voice service even if the 2G/3G network exists. It should be noted that when the gNB supports the voice service, and the UE needs to be handed over to the 4G network due to movement, the eNB may not support the voice service. In this case, the foregoing problem also exists. In this scenario, the method starts from that the gNB sends the handover required message to the AMF. Therefore, the foregoing operations 201 and 202 may be omitted. In addition, in this scenario, because the QoS flow corresponding to the voice service has been created, operation 205 may also be omitted.

Figure 3:
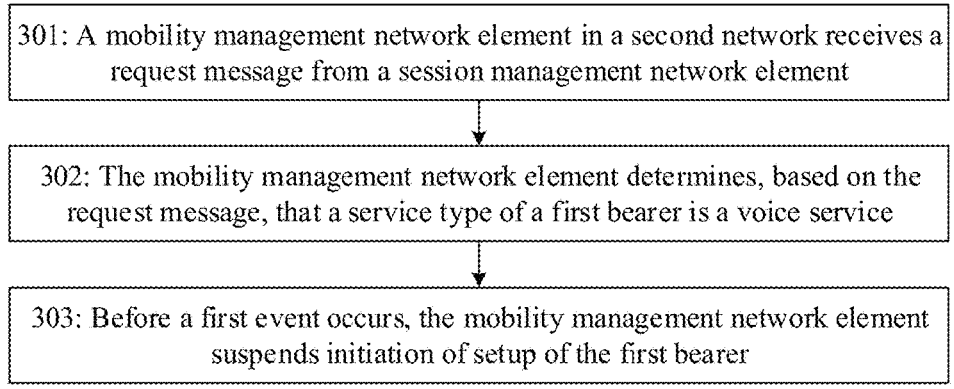
FIG. 3 is a schematic flowchart of a communication method for a voice service according to an embodiment of the present disclosure.

FIG. 3 shows a communication method for a voice service according to an embodiment of this application. FIG. 3 is described with reference to FIG. 2. The method includes the following operations.

Operation 301: A mobility management network element in a second network receives a request message from a session management network element, where the request message is used to request to set up a first bearer for a voice service of a terminal device, and the session management network element is used for session management in a first network and the second network. In an embodiment, a mobility management network element in a second network receives information about a first bearer from a mobility management network element in a first network.

For example, the first network is a 5G network, the second network is a 4G network, the mobility management network element in the second network is the foregoing MME, the session management network element is the foregoing PGW-C, and the mobility management network element in the first network is the foregoing AMF. In an embodiment, for operation 301, refer to the descriptions of operation 204 and operation 205 in FIG. 2. Details are not described herein again.

Operation 302: The mobility management network element determines, based on the request message, that a service type of the first bearer is the voice service.

Operation 303: Before a first event occurs, the mobility management network element suspends initiation of setup of the first bearer. The first event includes: The mobility management network element sends indication information to an access network element (for example, the foregoing eNB) in the second network, where the indication information indicates that a fallback of the voice service of the terminal device from the second network to a third network is supported. For example, the indication information is the foregoing SRVCC operation possible indication. In an embodiment, the first event includes: The mobility management network element determines that a fallback of the voice service of the terminal device from the second network to a third network is supported.

In an embodiment, for operations 302 and 303, refer to the descriptions of operation 206 in FIG. 2. Details are not described herein again.

In an embodiment, after the mobility management network element in the second network receives the request message from the session management network element, if the service type of the first bearer is the voice service, the mobility management network element suspends the initiation of the setup of the first bearer before sending the indication information to the access network element in the second network or determining that the fallback of the voice service of the terminal device from the second network to the third network is supported. Such a wait enables the access network element in the second network to learn, when receiving a request for setting up the first bearer, that the fallback of the voice service of the terminal device from the second network to the third network is supported. Therefore, even if the access network element in the second network does not support the voice service, after receiving the request for setting up the first bearer for the voice service, the access network element in the second network may hand over the terminal device to an access network element in the third network with same coverage to process the voice service of the terminal device, to maintain call continuity of the voice service and improve user experience.

In an embodiment, the method further includes: The mobility management network element receives a tracking area request message from the terminal device, where the tracking area request message carries capability information (for example, the foregoing SRVCC capability), and the capability information indicates that the terminal device supports a capability of falling back from the second network to the third network to maintain continuity of the voice service. The mobility management network element determines, based on the capability information, that the fallback of the voice service of the terminal device from the second network to the third network is supported. The mobility management network element sends the indication information to the access network element.

In an embodiment, the method further includes: The mobility management network element sends the capability information to a subscriber data management network element (for example, the foregoing HSS+UDM). The mobility management network element obtains subscription information of the terminal device from the subscriber data management network element, where the subscription information indicates that the terminal device has subscribed to the fallback from the second network to the third network to maintain the continuity of the voice service. The mobility management network element sends the capability information to the subscriber data management network element, so that a network element in another domain (for example, an IMS domain) can quickly obtain the capability information from the subscriber data management network element, to improve communication efficiency.

In an embodiment, the method further includes: The mobility management network element sends the indication information to the access network element when the terminal device supports the capability of falling back from the second network to the third network to maintain the continuity of the voice service and has subscribed to the fallback from the second network to the third network to maintain the continuity of the voice service.

In an embodiment, the method further includes: The mobility management network element initiates the setup of the first bearer after or when sending the indication information to the access network element. Therefore, the setup of the first bearer is initiated only after or when the mobility management network element sends the indication information to the access network element, to ensure that the access network element in the second network can learn that the fallback of the voice service of the terminal device from the second network to the third network is supported.

In an embodiment, the method further includes: The mobility management network element rejects the setup of the first bearer if determining that the fallback of the voice service of the terminal device from the second network to the third network is not supported.

Figure 4:
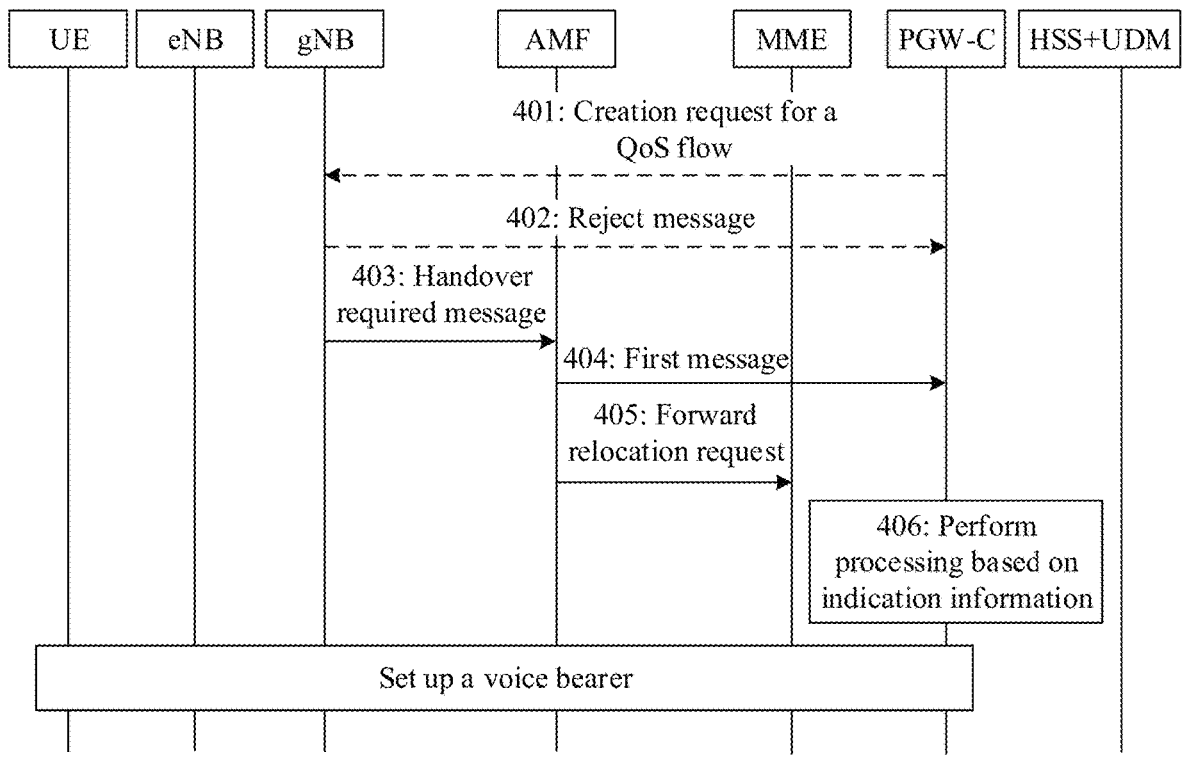
FIG. 4 is a signaling exchange diagram of a communication method for a voice service according to another embodiment of the present disclosure.

For a second solution, the following describes a communication method for a voice service according to an embodiment of this application with reference to FIG. 4. The method includes the following operations.

Operation 401: A PGW-C triggers creation of a QoS flow for a voice service.

For operation 401, refer to description of operation 201 in FIG. 2. Details are not described herein again.

Operation 402: When receiving the creation request for the QoS flow, the gNB rejects the creation of the QoS flow if not supporting the QoS flow.

For operation 402, refer to description of operation 202 in FIG. 2. Details are not described herein again.

In addition, in an embodiment, if the gNB determines to hand over UE to a 4G network through N26-based handover, the gNB includes indication information in the reject message, to indicate to hand over the UE to the 4G network through the N26-based handover to support an evolved packet system (EPS) fallback.

Operation 403: The gNB sends a handover required message to an AMF.

For operation 403, refer to description of operation 203 in FIG. 2. Details are not described herein again.

In addition, in an embodiment, the gNB may include indication information in the handover required message, to indicate that a handover cause is the EPS fallback.

Operation 404: The AMF sends a first message to the PGW-C.

In an embodiment, the first message includes inter-system handover indication information, where the inter-system handover indication information indicates to hand over the terminal device to the 4G network. In an embodiment, further, the AMF may send a handover cause value to the PGW-C, where the handover cause is the EPS fallback.

That is, in an embodiment, the gNB may send, to the PGW-C by using the reject message in operation 402, the indication information that indicates to hand over the UE to the 4G network through the N26-based handover to support the EPS fallback. In this case, the indication information or the handover cause value may not be carried in operation 404. In an embodiment, in an embodiment, the AMF sends the inter-system handover indication information to the PGW-C in operation 404, where the inter-system handover indication information indicates to hand over the terminal device to the 4G network. In this case, the reject message in operation 402 may not carry the indication information. In an embodiment, if the handover cause value is carried in operation 403, the handover cause value may also be carried in operation 404. For example, the handover cause value may be set as the EPS fallback.

In an embodiment, the foregoing description is to an EPS fallback scenario. In a non-EPS fallback scenario with common handover, the indication information carried in the first message indicates that the N26-based handover is being performed.

For example, the AMF may send the indication information to the PGW-C when obtaining a session context from the PGW-C. In a home routed roaming scenario or in a scenario in which an intermediate SMF (I-SMF) exists, the AMF sends the indication information to a visited SMF (V-SMF) or the I-SMF, and the V-SMF or the I-SMF sends the indication information to the PGW-C.

If the gNB supports the voice service and an IMS call has been initiated, when the UE is in the 5G network, a corresponding QoS flow has been created for the IMS voice service, and a corresponding bearer identifier (namely, an evolved packet system bearer ID, EBI) has been allocated to the IMS voice service. In this case, if the PGW-C receives the indication information sent by the gNB to the PGW-C in operation 402, or receives the indication information sent by the AMF to the PGW-C, in an embodiment, the PGW-C does not send a bearer context corresponding to the voice service to the AMF. In this way, a bearer corresponding to the voice service is not set up in a handover preparation phase, but is set up after handover is completed.

Operation 405: The AMF sends a forward relocation request to an MME, to perform a handover procedure.

Operation 406: The PGW-C performs processing based on the indication information.

A sequence of performing operations 405 and 406 is not limited in this application.

After receiving the indication information sent in operation 402 (that is, indicating to hand over the UE to the 4G network through the N26-based handover to support the EPS fallback) or receiving the inter-system handover indication information in operation 404, the PGW-C may perform processing by using the following methods:

Method 1: The PGW-C starts a timer, and triggers setup of the bearer for the voice service after the timer expires.

In the method, the PGW-C starts the timer, and triggers the setup of the bearer for the voice service after the timer expires. The timer is used to wait for the handover procedure to end. For example, "handover procedure ends" considered by the timer may mean that the MME has sent an SRVCC operation possible indication to the eNB. In an embodiment, the "handover procedure ends" further requires that the MME have sent an SRVCC capability of the UE to an HSS+UDM. Duration of the timer may be configured on the PGW-C through predefinition.

Method 2: The PGW-C initiates setup of the bearer for the voice service after waiting for first notification information sent by the MME.

The first notification information is used to notify that the UE has been successfully handed over from the 5G network to the 4G network. In the method, the MME first receives a 4G-to-2G/3G SRVCC capability (referred to as an SRVCC capability for short below) from the UE, sends the SRVCC capability of the UE to an HSS+UDM, and learns, from the HSS+UDM, whether the terminal device has subscribed to 4G-to-2G/3G SRVCC. In this way, the MME sends an SRVCC operation possible indication to the eNB based on the SRVCC capability and subscription information of the UE. After sending the SRVCC operation possible indication to the eNB, the MME sends the first notification information to the PGW-C. In an embodiment, the MME sends the first notification information to the PGW-C after sending the SRVCC operation possible indication to the eNB and sending the SRVCC capability of the UE to the HSS+UDM.

It should be noted that the MME may send the first notification information to the PGW-C through an S-GW.

In an embodiment, this manner may also be combined with a timer. In an embodiment, the PGW-C starts the timer after receiving the indication information. If the PGW-C still has not received the first notification information from the MME after the timer expires, the PGW-C initiates the setup of the bearer for the voice service after the timer expires. In other words, the timer is used to wait for the PGW-C to receive the first notification information from the MME.

Method 3: The PGW-C initiates setup of the bearer for the voice service after waiting for second notification information sent by an HSS+UDM.

In the method, after receiving an SRVCC capability of the UE sent by the MME, the HSS+UDM sends the second notification information to the PGW-C. After receiving the second notification information, the PGW-C initiates the setup of the bearer for the voice service. In this manner, in the handover procedure in operation 405, the MME needs to first send an SRVCC operation possible indication to the eNB, and then send the SRVCC capability of the UE to the HSS+UDM. In an embodiment, if a TAU request message of the UE received by the MME carries the SRVCC capability of the UE, the MME first obtains subscription information of the UE from the HSS+UDM. When obtaining the subscription information, the MME temporarily does not send the SRVCC capability of the UE to the HSS+UDM. In this way, the MME sends the SRVCC operation possible indication to the eNB based on the SRVCC capability and the subscription information of the UE, and further sends the SRVCC capability of the UE to the HSS+UDM after sending the indication to the eNB. This can ensure that the eNB has received the SRVCC operation possible indication when the PGW-C receives an SRVCC indication from the HSS+UDM, so that when the eNB receives a bearer setup request for the voice service, even if the eNB does not support the bearer corresponding to the voice service, the eNB can still hand over the UE to a 2G/3G network to support the SRVCC, to maintain continuity of the voice service.

In an embodiment, in this manner, the PGW-C may subscribe to a UE SRVCC capability change notification message from the HSS+UDM. In this way, when receiving the SRVCC capability of the UE sent by the MME, the HSS+UDM sends the second notification information to the PGW-C. After receiving the second notification information, the PGW-C initiates the setup of the bearer corresponding to the voice service. For example, the second notification information may be an SRVCC capability indication.

For example, the PGW-C may subscribe to the UE SRVCC capability change notification from the HSS+UDM during session establishment. For example, if a packet data unit (PDU) session is used for the IMS call, the PGW-C may subscribe to the notification message during the session establishment. In an embodiment, the PGW-C may subscribe to the notification message from the HSS+UDM when receiving a message for triggering the setup of the bearer for the voice service, for example, when receiving a PCC rule of the voice service.

In an embodiment, similar to the method 2, this manner may also be combined with a timer. In an embodiment, the PGW-C starts the timer after receiving the indication information. If the PGW-C still has not received the second notification information from the HSS+UDM when the timer expires, the PGW-C triggers the setup of the bearer corresponding to the voice service. In other words, the timer is used to wait for the PGW-C to receive the second notification information from the HSS+UDM.

It should be noted that there are the following two scenarios in which the PGW-C initiates the setup of the bearer for the voice service:

After triggering of the setup of the QoS flow corresponding to the voice service by the PGW-C in operation 401 is rejected, the PGW-C waits until a first moment to re-trigger the setup of the bearer corresponding to the voice service.

The PGW-C has successfully set up the QoS flow corresponding to the voice service on the gNB. However, when the UE is handed over to the 4G network, the PGW-C does not send bearer information corresponding to the voice service to the MME. The PGW-C waits until a first moment to re-trigger the setup of the bearer corresponding to the voice service in the 4G network.

Therefore, in an embodiment, when the PGW-C triggers the setup of the bearer, if the UE supports the SRVCC and has subscribed to the SRVCC, the eNB has received the SRVCC operation possible indication. In this case, if the eNB does not support the bearer, the eNB may initiate an SRVCC procedure, to hand over the UE to the 2G/3G network, so that the voice service can continue to be processed, and a failure of the voice service is avoided.

The embodiment in FIG. 4 provides a method for supporting SRVCC during an EPS fallback, to resolve a conventional-technology problem of failing to process a voice service, where the problem occurs in the following case:

When UE initiates a voice call, because a gNB does not support the voice service, the UE falls back to a 4G network; when an eNB does not support the voice service either, SRVCC cannot be initiated, and consequently the UE cannot be migrated to a 2G/3G network with same coverage to continue the voice service even if the 2G/3G network exists. It should be noted that when the gNB supports the voice service, and the UE needs to be handed over to the 4G network due to movement, the eNB may not support the voice service. In this case, the foregoing problem also exists. In this scenario, the method starts from that the gNB sends the handover required message to the AMF. Therefore, the foregoing operations 401 and 402 may be omitted. In this scenario, the AMF may only need to send the N26-based handover indication to the PGW-C in operation 404.

Figure 5:
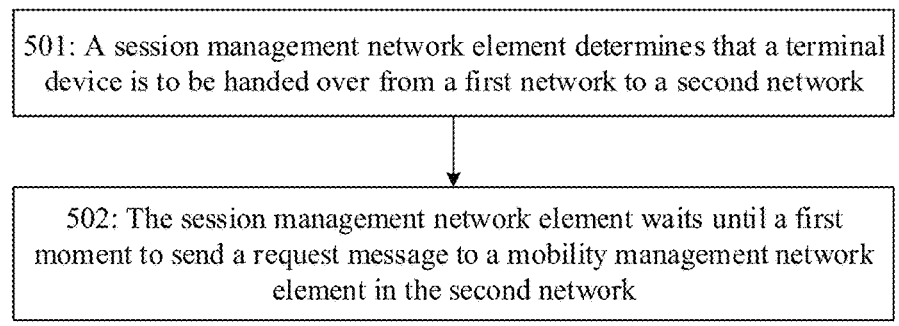
FIG. 5 is a schematic flowchart of a communication method for a voice service according to another embodiment of the present disclosure.

FIG. 5 shows a communication method for a voice service according to an embodiment of this application. FIG. 5 is described with reference to FIG. 4. The method includes the following operations.

Operation 501: A session management network element determines that a terminal device is to be handed over from a first network to a second network, where the session management network element is used for session management in the first network and the second network.

For example, the first network is a 5G network, the second network is a 4G network, and the session management network element is the foregoing PGW-C. In an embodiment, for operation 501, refer to description of operation 404 in FIG. 4.

For example, in an embodiment, the method further includes: The session management network element triggers establishment of a data transmission channel (for example, a QoS flow in the 5G network) of the first network for a voice service of the terminal device. The session management network element receives a reject message (for example, the reject message in operation 402) from an access network element in the first network, where the reject message is used to reject the establishment of the data transmission channel for the voice service, the reject message includes first indication information, the first indication information indicates that the access network element initiates handover of the terminal device from the first network to the second network through a first interface, and the first interface is an interface (for example, the foregoing N26 interface) between a mobility management network element in the first network and the mobility management network element in the second network. In other words, the PGW-C may determine that the UE is to be handed over from the 5G network to the 4G network due to an EPS fallback.

In an embodiment, in an embodiment, the method further includes: The session management network element receives a context request message (for example, the first message in operation 404) from a mobility management network element in the first network, where the context request message includes second indication information, and the second indication information indicates to hand over the terminal device from the first network to the second network. In other words, in a non-EPS fallback scenario, the PGW-C may also determine that the UE is to be handed over from the 5G network to the 4G network.

In an embodiment, if the session management network element receives the first indication information or the second indication information, the session management network element skips sending information about a first bearer to the mobility management network element in the first network.

Operation 502: The session management network element waits until a first moment to send a request message to the mobility management network element in the second network, where the request message is used to request to set up the first bearer for the voice service of the terminal device.

In an embodiment, in a scenario in which the terminal device is handed over from the first network to the second network, the session management network element does not immediately request to set up the first bearer for the voice service of the terminal device. The session management network element waits until the first moment to request to set up the first bearer for the voice service of the terminal device. Such a wait enables an access network element in the second network to have a sufficient time period to learn that a fallback of the voice service of the terminal device from the second network to a third network is supported. Therefore, even if the access network element in the second network does not support the voice service, the access network element in the second network may hand over the terminal device to an access network element in the third network with same coverage to process the voice service of the terminal device, to maintain call continuity of the voice service and improve user experience.

The first bearer may be a bearer, corresponding to the voice service, that the session management network element requests to set up but the access network element in the first network rejects to set up, or may be a bearer corresponding to the voice service that has been set up in the first network but has not been sent by the session management network element to the second network.

In an embodiment, operation 502 includes: The session management network element starts a timer, where the first moment is a moment at which the timer expires.

For example, the timer is used to wait for the terminal device to complete handover from the first network to the second network (namely, the manner 1 in FIG. 4).

In an embodiment, the timer is used to wait for the session management network element to receive first notification information from the mobility management network element in the second network, where the first notification information indicates that the terminal device is successfully handed over from the first network to the second network (namely, the timer in the manner 2 in FIG. 4).

In an embodiment, the timer is used to wait for the session management network element to receive second notification information from a subscriber data management network element, where the second notification information indicates that the terminal device supports a capability of falling back from the second network to the third network to maintain continuity of the voice service (namely, the timer in the manner 3 in FIG. 4).

Therefore, a timer mechanism can ensure that the access network element in the second network has the sufficient time period to learn that the fallback of the voice service of the terminal device from the second network to the third network is supported.

In an embodiment, the first moment is a moment at which the session management network element receives first notification information from the mobility management network element in the second network, and the first notification information indicates that the terminal device is successfully handed over from the first network to the second network (for example, refer to description in the manner 2 in FIG. 4). Therefore, the mobility management network element in the second network notifies the session management network element only after the terminal device is successfully handed over from the first network to the second network, and then the session management network element requests to set up the first bearer for the voice service of the terminal device. In a process in which the terminal device is successfully handed over from the first network to the second network, the mobility management network element in the second network has notified the access network element in the second network that the fallback of the voice service of the terminal device from the second network to the third network is supported. In an embodiment, the mobility management network element in the second network has sent, to the subscriber data management network element, an SRVCC capability that is supported by the terminal device and that is of falling back from the second network to the third network. Therefore, even if the access network element in the second network does not support the voice service, the access network element in the second network may hand over the terminal device to the access network element in the third network with same coverage to process the voice service of the terminal device, to maintain the call continuity of the voice service and improve user experience.

In an embodiment, the first moment is a moment at which the session management network element receives second notification information from a subscriber data management network element, and the second notification information indicates that the terminal device supports a capability of falling back from the second network to the third network to maintain continuity of the voice service (for example, refer to description in the manner 3 in FIG. 4). Therefore, the subscriber data management network element notifies the session management network element after learning that the terminal device has the capability of maintaining the continuity of the voice service, and then the session management network element requests to set up the first bearer for the voice service of the terminal device. Before the subscriber data management network element learns that the terminal device has the capability of maintaining the continuity of the voice service, the mobility management network element in the second network has notified the access network element in the second network that the fallback of the voice service of the terminal device from the second network to the third network is supported. Therefore, even if the access network element in the second network does not support the voice service, the access network element in the second network may hand over the terminal device to the access network element in the third network with same coverage to process the voice service of the terminal device, to maintain the call continuity of the voice service and improve user experience.

In an embodiment, the method further includes: The session management network element sends a subscription request to the subscriber data management network element, where the subscription request is used to request the subscriber data management network element to send the second notification information to the session management network element after learning, from the mobility management network element in the second network, that the terminal device supports the capability of falling back from the second network to the third network to maintain the continuity of the voice service. For example, the session management network element sends the subscription request to the subscriber data management network element in a session establishment process or in a process in which the session management network element establishes the data transmission channel of the first network for the voice service.

Figure 6:
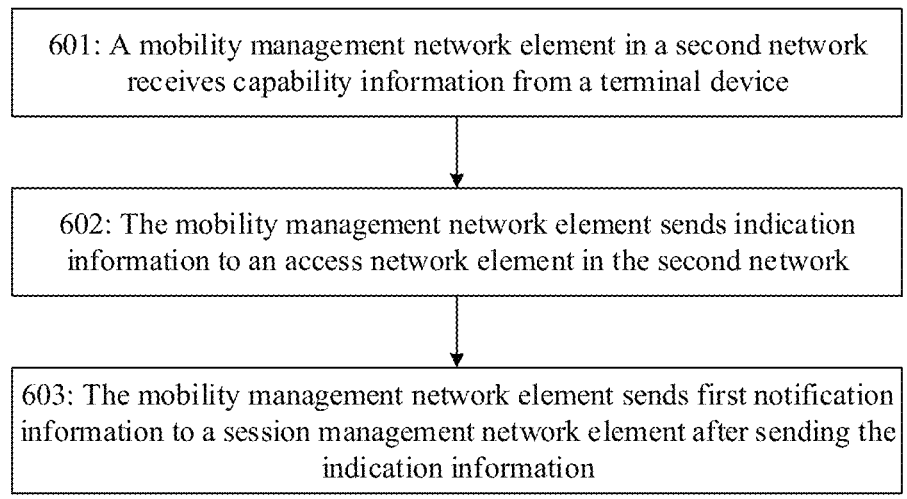
FIG. 6 is another schematic flowchart of a communication method for a voice service according to another embodiment of the present disclosure.

FIG. 6 shows a communication method for a voice service according to an embodiment of this application. FIG. 6 is also described with reference to FIG. 4. The method includes the following operations.

Operation 601: A mobility management network element in a second network receives capability information from a terminal device, where the capability information indicates that the terminal device supports a capability of falling back from the second network to a third network to maintain continuity of a voice service.

For example, the second network is a 4G network, and the third network is a 2G/3G network. The mobility management network element in the second network is the foregoing MME.

Operation 602: The mobility management network element sends indication information to an access network element in the second network, where the indication information indicates that a fallback of the voice service of the terminal device from the second network to the third network is supported.

For example, the indication information is an SRVCC operation possible indication.

Operation 603: The mobility management network element sends first notification information to a session management network element after sending the indication information, where the first notification information indicates that the terminal device is successfully handed over from a first network to the second network.

For operations 601 to 603, refer to description in the manner 2 in operation 406 in FIG. 4. Details are not described herein again.

In an embodiment, in a scenario in which the terminal device is handed over from the first network to the second network, the mobility management network element in the second network notifies the session management network element only after the terminal device is successfully handed over from the first network to the second network, and then the session management network element requests to set up a first bearer for the voice service of the terminal device. In a process in which the terminal device is successfully handed over from the first network to the second network, the mobility management network element in the second network has notified an access network element in the second network that the fallback of the voice service of the terminal device from the second network to the third network is supported. Therefore, after the access network element in the second network receives a request for setting up the first bearer for the voice service, even if the access network element in the second network does not support the voice service, the access network element in the second network may hand over the terminal device to an access network element in the third network with same coverage to process the voice service of the terminal device, to maintain call continuity of the voice service and improve user experience.

In an embodiment, the method further includes: The mobility management network element sends the capability information to a subscriber data management network element. The mobility management network element obtains subscription information of the terminal device from the subscriber data management network element, where the subscription information indicates that the terminal device has subscribed to the fallback from the second network to the third network to maintain the continuity of the voice service. For details, refer to description of operation 209 in FIG. 2. The details are not described herein again.

Figure 7:
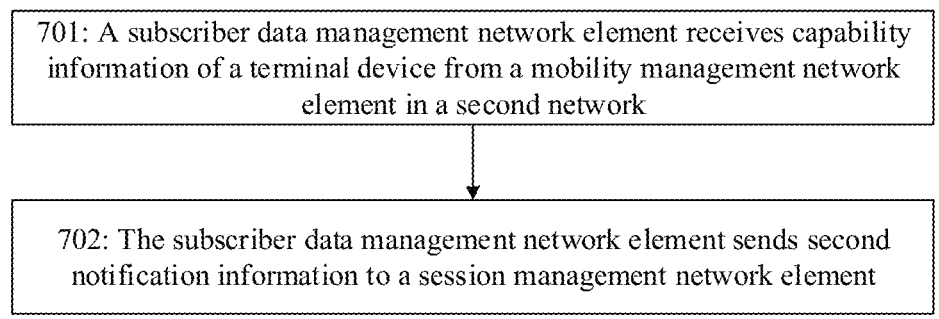
FIG. 7 is still another schematic flowchart of a communication method for a voice service according to another embodiment of the present disclosure.

FIG. 7 shows a communication method for a voice service according to an embodiment of this application. FIG. 7 is also described with reference to FIG. 4. The method includes the following operations.

Operation 701: A subscriber data management network element receives capability information of a terminal device from a mobility management network element in a second network, where the capability information indicates that the terminal device supports a capability of falling back from the second network to a third network to maintain continuity of a voice service.

Operation 702: The subscriber data management network element sends second notification information to a session management network element, where the second notification information indicates that the terminal device supports the capability of falling back from the second network to the third network to maintain the continuity of the voice service, and the session management network element is used for session management in a first network and the second network.

For example, the second network is a 4G network, and the third network is a 2G/3G network. The mobility management network element in the second network is the foregoing MME. The subscriber data management network element is the foregoing HSS+UDM.

For operations 701 and 702, refer to description in the manner 3 in operation 406 in FIG. 4. Details are not described herein again.

In an embodiment, in a scenario in which the terminal device is handed over from the first network to the second network, the subscriber data management network element notifies the session management network element after learning that the terminal device has the capability of maintaining the continuity of the voice service, and then the session management network element requests to set up a first bearer for the voice service of the terminal device. Before the subscriber data management network element learns that the terminal device has the capability of maintaining the continuity of the voice service, the mobility management network element in the second network has notified an access network element in the second network that a fallback of the voice service of the terminal device from the second network to the third network is supported. Therefore, after the access network element in the second network receives a request for setting up the first bearer for the voice service, even if the access network element in the second network does not support the voice service, the access network element in the second network may hand over the terminal device to an access network element in the third network with same coverage to process the voice service of the terminal device, to maintain call continuity of the voice service and improve user experience.

In an embodiment, the method further includes: The subscriber data management network element receives a subscription request from the session management network element, where the subscription request is used to request the subscriber data management network element to send the second notification information to the session management network element after learning, from the mobility management network element in the second network, that the terminal device supports the capability of falling back from the second network to the third network to maintain the continuity of the voice service.

For a third solution, the following describes a communication method for a voice service according to an embodiment of this application with reference to FIG. 8. The method includes the following operations.

Operation 801: A PGW-C triggers creation of a QoS flow for a voice service.

For operation 801, refer to description of operation 201 in FIG. 2. Details are not described herein again.

Operation 802: When receiving the creation request for the QoS flow, the gNB rejects the creation of the QoS flow if not supporting the QoS flow.

For operation 802, refer to description of operation 202 in FIG. 2. Details are not described herein again.

Operation 803: The gNB sends a handover required message to an AMF.

For operation 803, refer to description of operation 203 in FIG. 2. Details are not described herein again.

In addition, in an embodiment, the gNB may include indication information in the handover required message, to indicate that a handover cause is an EPS fallback.

Operation 804: The AMF determines an SRVCC capability of the UE.

For example, the AMF may determine that voice centric UE is UE that supports SRVCC. In an embodiment, the AMF may determine, based on information such as a vendor and a model of UE, whether the UE supports a 4G-to-2G/3G SRVCC capability. For example, an international mobile equipment identity (IMEI) of the UE includes vendor information, and optionally may further include model information. For example, the first eight digits of the IMEI are usually used to identify the vendor, and the AMF may read IMEI information to obtain either of the vendor information and the model information.

In addition, the AMF may alternatively determine the SRVCC capability of the UE in another manner. This is not limited in the present disclosure.

It should be noted that the AMF may determine the SRVCC capability of the UE after operation 803. For example, the AMF determines the SRVCC capability of the UE after receiving the handover cause being the EPS fallback. In an embodiment, the AMF may determine the SRVCC capability of the UE during registration of the UE or in a process of establishing a PDU session corresponding to the voice service. This is not limited in an embodiment.

Operation 805: The AMF obtains subscription data of the UE from an HSS+UDM.

The subscription information indicates whether the UE has subscribed to a fallback from a 4G network to a 2G/3G network to maintain continuity of the voice service. For example, the AMF determines, based on the received subscription information, whether the UE has subscribed to the SRVCC.

In an embodiment, in this operation, the AMF sends the SRVCC capability of the UE to the HSS+UDM. For example, after determining the SRVCC capability of the UE, the AMF stores the SRVCC capability of the UE in the HSS+UDM.

The AMF may obtain the subscription information of the UE after operation 804, or may first obtain the SRVCC subscription information of the UE and then determine the SRVCC capability of the UE. This is not limited in an embodiment.

Operation 806: The AMF sends a forward relocation request to an MME.

For example, the AMF selects the MME based on information about the eNB, and sends the forward relocation request to the MME. After receiving the forward relocation request, the MME initiates 5G-to-4G handover. The forward relocation request includes the SRVCC capability that is of the UE and that is determined by the AMF. In an embodiment, the forward relocation request includes the subscription information of the UE obtained by the AMF from the HSS+UDM. The AMF transmits the subscription information of the UE to the MME, so that signaling exchange between the MME and the HSS+UDM in a handover procedure can be avoided.

Operation 807: The MME sends an SRVCC operation possible indication to the eNB.

For example, in the handover procedure, the MME may send the SRVCC operation possible indication to the eNB. For example, the MME sends the SRVCC operation possible indication to the eNB in a handover request message sent to the eNB.

It should be noted that the MME needs to learn whether the UE has subscribed to the SRVCC. In an embodiment, the AMF sends, to the MME in operation 806, the subscription information indicating that the UE has subscribed to the SRVCC. In this way, the MME does not need to obtain the subscription information from the HSS+UDM in the handover procedure, to reduce a delay.

In an embodiment, in an embodiment, before sending the SRVCC operation possible indication to the eNB, the MME obtains SRVCC subscription of the UE from the HSS+UDM, and then determines, based on the SRVCC capability of the UE and the SRVCC subscription of the UE, whether to send the SRVCC operation possible indication to the eNB. In an embodiment, the MME may alternatively store, in the HSS+UDM, the SRVCC capability of the UE obtained from the AMF.

In an embodiment, because the MME has sent the SRVCC operation possible indication to the eNB in the handover request message, and a bearer setup request for the voice service has been sent to the eNB in the handover request message, the eNB can correctly process the bearer setup request corresponding to the voice service. For example, if the eNB does not support a bearer corresponding to the voice service, the eNB may initiate the SRVCC to hand over the UE to the 2G/3G network, so that the voice service can continue to be processed through the 2G/3G network.

The embodiment in FIG. 8 provides a method for supporting SRVCC during an EPS fallback, to resolve a conventional-technology problem of failing to process a voice service, where the problem occurs in the following case: When UE initiates a voice call, because a gNB does not support the voice service, the UE falls back to a 4G network; when an eNB does not support the voice service either, SRVCC cannot be initiated, and consequently the UE cannot be migrated to a 2G/3G network with same coverage to continue the voice service even if the 2G/3G network exists. It should be noted that when the gNB supports the voice service, and the UE needs to be handed over to the 4G network due to movement, the eNB may not support the voice service. In this case, the foregoing problem also exists. In this scenario, the method starts from that the gNB sends the handover required message to the AMF. Therefore, the foregoing operations 801 and 802 may be omitted.

FIG. 9 shows a communication method for a voice service according to an embodiment of this application. FIG. 9 is described with reference to FIG. 8. The method includes the following operations.

Operation 901: A mobility management network element in a first network determines that a terminal device has a capability of falling back from a second network to a third network to process a voice service.

For example, the first network is a 5G network, the second network is a 4G network, and the third network is a 2G/3G network. The mobility management network element in the first network is the foregoing AMF.

In an embodiment, the mobility management network element in the first network determines, based on an IMEI of the terminal device, whether the terminal device supports the capability of falling back from the second network to the third network to process the voice service.

In an embodiment, the mobility management network element in the first network determines that a voice-centric terminal device has the capability of falling back from the second network to the third network to process the voice service.

In an embodiment, for operation 901, refer to description of operation 804 in FIG. 8. Details are not described herein again.

Operation 902: The mobility management network element in the first network sends capability information of the terminal device to a mobility management network element in the second network, where the capability information indicates that the terminal device supports the capability of falling back from the second network to the third network to maintain continuity of the voice service.

The mobility management network element in the second network is the foregoing MME. The capability information may be the foregoing SRVCC capability.

In an embodiment, for operation 902, refer to description of operation 806 in FIG. 8. For example, the mobility management network element in the first network sends the capability information of the terminal device to the mobility management network element in the second network by using a forward relocation request message or a context response message.

In an embodiment, the mobility management network element in the first network can determine that the terminal device has the capability of falling back from the second network to the third network to process the voice service, and sends the capability information of the terminal device to the mobility management network element in the second network. Therefore, the mobility management network element in the second network can learn that the terminal device supports the capability of falling back from the second network to the third network to maintain the continuity of the voice service, and may send indication information to an access network element in the second network when or before requesting the access network element in the second network to set up a bearer for the voice service, where the indication information indicates that a fallback of the voice service of the terminal device from the second network to the third network is supported. In this way, even if the access network element in the second network does not support the voice service, after receiving a request for setting up a first bearer for the voice service, the access network element in the second network may hand over the terminal device to an access network element in the third network with same coverage to process the voice service of the terminal device, to maintain call continuity of the voice service and improve user experience.

In an embodiment, the method further includes: The mobility management network element in the first network sends the capability information to a subscriber data management network element. The mobility management network element sends the capability information to the subscriber data management network element, so that a network element in another domain (for example, an IMS domain) can quickly obtain the capability information from the subscriber data management network element, to improve communication efficiency.

In an embodiment, the method further includes: The mobility management network element in the first network obtains subscription information of the terminal device from the subscriber data management network element, where the subscription information indicates that the terminal device has subscribed to the fallback from the second network to the third network to maintain the continuity of the voice service. For details, refer to description of operation 805 in FIG. 8. The details are not described herein again. For example, the mobility management network element in the first network sends the subscription information to the mobility management network element in the second network by using the forward relocation request message or the context response message.

Figure 10:
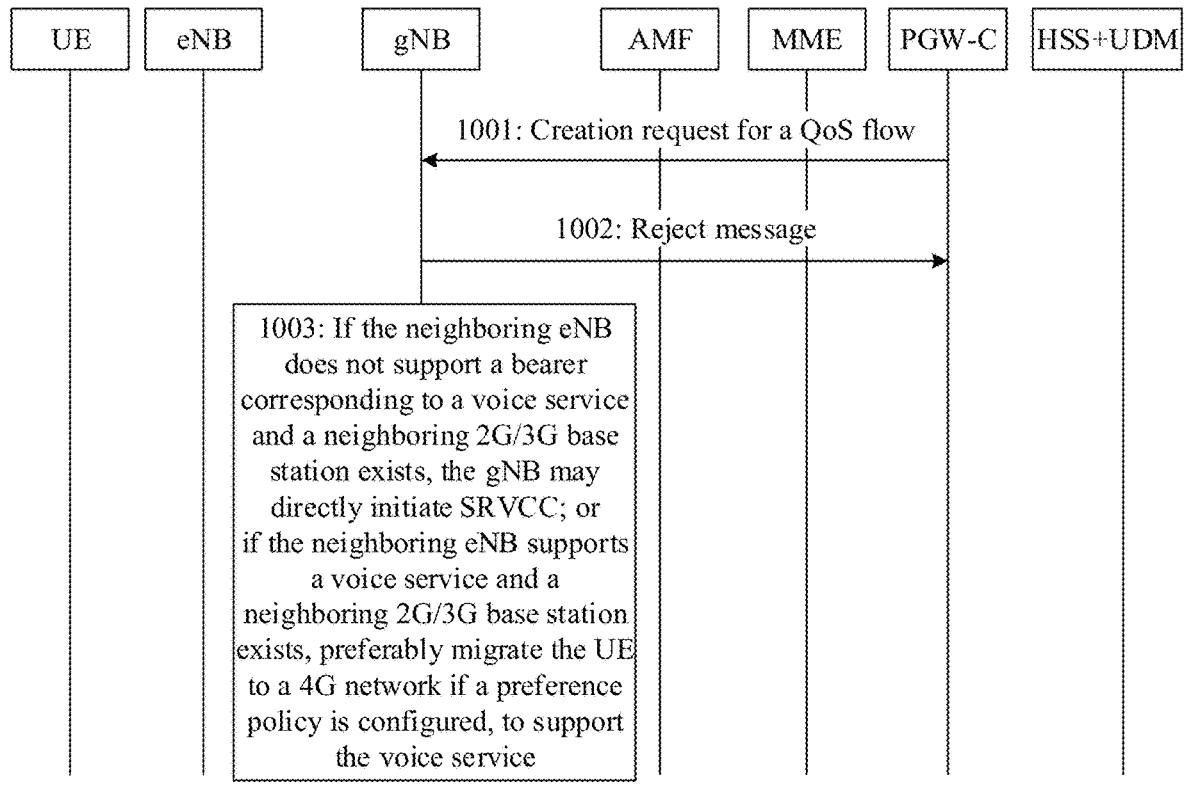
FIG. 10 is a signaling exchange diagram of a communication method for a voice service according to still another embodiment of the present disclosure.

For a fourth solution, the following describes a communication method for a voice service according to an embodiment of this application with reference to FIG. 10. The method includes the following operations.

Operation 1000: A gNB configures whether a neighboring eNB supports a bearer corresponding to a voice service.

For example, the bearer corresponding to the voice service is a bearer with a QCI=1.

In an embodiment, the gNB may further configure a preference policy. The preference policy means that when a 4G network supports the bearer corresponding to the voice service and 2G/3G coverage exists, handover to the 4G network is preferred to support the voice service.

Operation 1001: A PGW-C triggers creation of a QoS flow for the voice service.

For operation 1001, refer to description of operation 201 in FIG. 2. Details are not described herein again.

Operation 1002: When receiving the creation request for the QoS flow, the gNB rejects the creation of the QoS flow if not supporting the QoS flow.

For operation 1002, refer to description of operation 202 in FIG. 2. Details are not described herein again.

Operation 1003: If the neighboring eNB does not support the bearer corresponding to the voice service, a neighboring 2G/3G base station exists, and UE supports 5G-to-2G/3G SRVCC, the gNB may directly initiate the SRVCC (namely, a 5G SRVCC function), so that the UE directly falls back to a 2G/3G network, and the voice service of the UE can continue to be processed through the 2G/3G network.

If the neighboring eNB supports the bearer corresponding to the voice service, the gNB may hand over the UE to the eNB. Because the eNB supports the bearer corresponding to the voice service, after the UE is handed over to the 4G network, the eNB may set up a corresponding bearer when the PGW-C initiates setup of the bearer corresponding to the voice service, to ensure continuity of the voice service.

If the neighboring eNB supports the voice service and a neighboring 2G/3G base station exists, the UE is preferably migrated to the 4G network if the preference policy is configured, to support the voice service. Otherwise, the gNB may migrate the UE to the 4G network, or directly migrate the UE to the 2G/3G network, to continue to process the voice service.

If the gNB supports the voice service and an IMS call has been initiated, when the UE is in the 5G network, a corresponding QoS flow has been created for an IMS voice service, and a corresponding bearer identifier (namely, an evolved packet system bearer ID, EBI) has been allocated to the IMS voice service. In this case, movement of the UE may also trigger handover. Therefore, the gNB needs to determine that a transmission channel is established for the voice service. If the QoS flow is created for the voice service, the gNB also performs processing in the manner in operation 1003. For example, the gNB may determine, based on a 5QI corresponding to the QoS flow, that the QoS flow is the QoS flow corresponding to the voice service.

Figure 11:
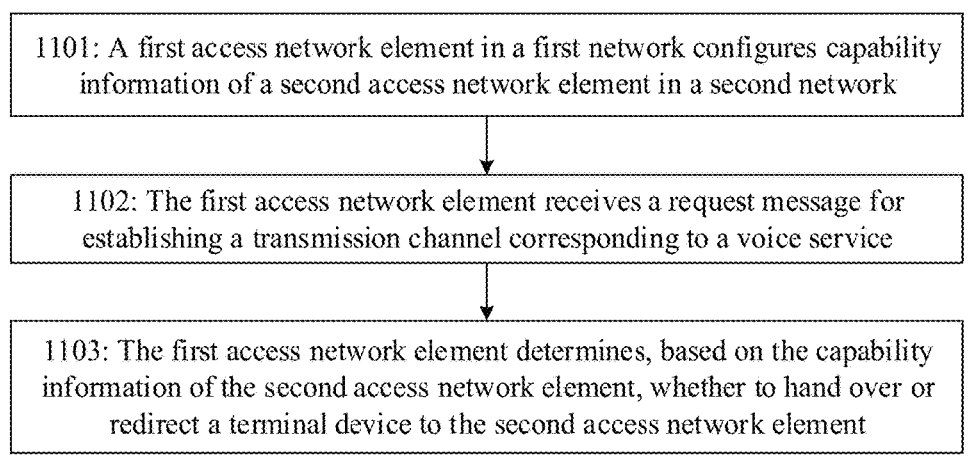
FIG. 11 is a schematic flowchart of a communication method for a voice service according to still another embodiment of the present disclosure.

FIG. 11 shows a communication method for a voice service according to an embodiment of this application. FIG. 11 is described with reference to FIG. 10. The method includes the following operations.

Operation 1101: A first access network element in a first network configures capability information of a second access network element in a second network, where the capability information indicates whether the second access network element supports a capability for a voice service, and the second access network element is a neighboring access network element of the first access network element.

For example, the first network is a 5G network, and the second network is a 4G network. The first access network element in the first network is a gNB. The second access network element in the second network is an eNB.

In an embodiment, for operation 1101, refer to description of operation 1000 in FIG. 10. Details are not described herein again.

Operation 1102: The first access network element receives a request message for establishing a transmission channel corresponding to the voice service, or determines that a corresponding transmission channel has been established for the voice service.

In an embodiment, for operation 1102, refer to description of operation 1001 and operation 1003 in FIG. 10. Details are not described herein again.

Operation 1103: The first access network element determines, based on the capability information of the second access network element, whether to hand over or redirect a terminal device to the second access network element.

In an embodiment, for operation 1103, refer to description of operation 1003 in FIG. 10. Details are not described herein again.

Therefore, according to the solution provided in an embodiment, the first access network element in the first network can determine, based on the capability information of the second access network element, whether to hand over or redirect the terminal device to the second access network element. In this way, regardless of whether the access network element in the second network supports the voice service, the capability information of the second access network element is considered for handover or redirection, to maintain call continuity of the voice service and improve user experience.

In an embodiment, the method further includes: When the second access network element supports the voice service, the first access network element hands over or redirects the terminal device to the second access network element. For example, when the second access network element and a third access network element in a third network (for example, a 2G/3G network) exist in a co-coverage area of the first access network element, and the second access network element supports the voice service, the first access network element hands over or redirects the terminal device to the second access network element according to a configured preference policy. In this way, the terminal device is preferably handed over or redirected to the second access network element, so that continuity of a data service can be supported while continuity of the voice service is supported.

It should be noted that, that the second access network element and the third access network element in the third network exist in the co-coverage area of the first access network element means: The terminal device can access the second access network element and the third access network element in the third network at a location of the terminal device. In other words, strength/quality of a signal between the terminal device and the second access network element is higher than a threshold for communication, and strength/quality of a signal between the terminal device and the third access network element is higher than a threshold for communication.

In an embodiment, the method further includes: When the second access network element does not support the voice service, if a third access network element in a third network exists in a co-coverage area of the first access network element, and the terminal device supports a fallback from the first network to the third network to maintain continuity of the voice service, the first access network element hands over or redirects the terminal device to the third access network element, where the third access network element is a neighboring access network element of the second access network element. In this way, even if the access network element in the second network does not support the voice service, the access network element in the third network with same coverage can process the voice service of the terminal device, to maintain the call continuity of the voice service and improve user experience.

It should be noted that the messages in the foregoing figures may have other names. In addition, information transmission among the network elements may also be implemented by invoking network functions of the network elements in a service-oriented architecture. This is not limited herein in the present disclosure.

In the foregoing embodiments provided in this application, the solutions such as the session information management method provided in embodiments of this application are separately described from the perspective of network elements and the perspective of interaction between the network elements. It may be understood that, to implement the foregoing functions, the communication apparatuses such as the session management network element, the mobility management network element, the subscriber data management network element, or the access network element include corresponding hardware structures and/or software modules for performing the functions. One of ordinary skilled in the art should be easily aware that, with reference to units and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. One of ordinary skilled in the art may use different methods to implement the described functions for each particular application, but it should not be considered that the implementation goes beyond the scope of this application.

Figure 12:
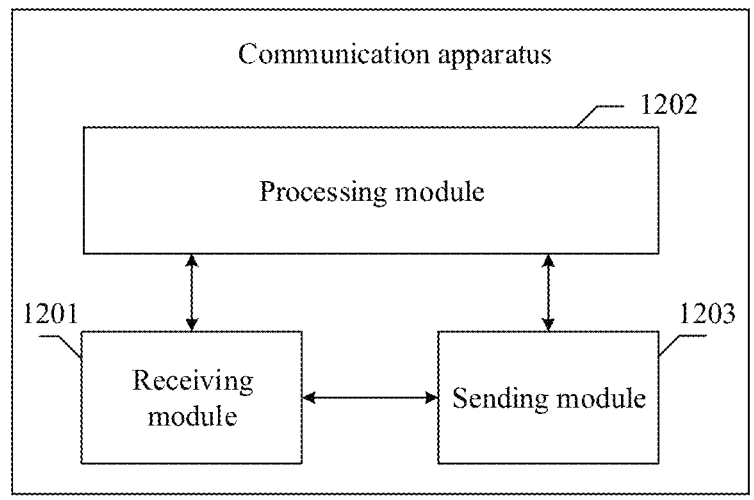
FIG. 12 and FIG. 13 are schematic diagrams of a structure of a communication apparatus for a voice service according to an embodiment of the present disclosure.

For example, when the communication apparatus implements a corresponding function by using a software module, the communication apparatus may include a receiving module 1201, a processing module 1202, and a sending module 1203, as shown in FIG. 12.

In an embodiment, the communication apparatus may be configured to perform an operation of the MME in FIG. 2 or an operation of the mobility management network element in the second network in FIG. 3.

For example, the receiving module 1201 is configured to receive a request message from a session management network element, where the request message is used to request to set up a first bearer for a voice service of a terminal device. The processing module 1202 is configured to: determine, based on the request message, that a service type of the first bearer is the voice service; and suspend initiation of setup of the first bearer before a first event occurs. The first event includes: The communication apparatus sends indication information to an access network element in the second network, where the indication information indicates that a fallback of the voice service of the terminal device from the second network to a third network is supported. In an embodiment, the first event includes: The mobility management network element determines that a fallback of the voice service of the terminal device from the second network to a third network is supported.

In an embodiment, after the communication apparatus receives the request message from the session management network element, if the service type of the first bearer is the voice service, the communication apparatus suspends the initiation of the setup of the first bearer before sending the indication information to the access network element in the second network or determining that the fallback of the voice service of the terminal device from the second network to the third network is supported. Such a wait enables the access network element in the second network to learn, when receiving a request for setting up the first bearer, that the fallback of the voice service of the terminal device from the second network to the third network is supported. Therefore, even if the access network element in the second network does not support the voice service, after receiving the request for setting up the first bearer for the voice service, the access network element in the second network may hand over the terminal device to an access network element in the third network with same coverage to process the voice service of the terminal device, to maintain call continuity of the voice service and improve user experience.

For example, the indication information is an SRVCC operation possible indication.

In an embodiment, the receiving module 1201 is further configured to receive a tracking area request message from the terminal device, where the tracking area request message carries capability information, and the capability information indicates that the terminal device supports a capability of falling back from the second network to the third network to maintain continuity of the voice service. The processing module 1202 is further configured to determine, based on the capability information, that the fallback of the voice service of the terminal device from the second network to the third network is supported. The mobility management network element sends the indication information to the access network element.

In an embodiment, the sending module 1203 is configured to send the capability information to a subscriber data management network element. The receiving module 1201 is further configured to obtain subscription information of the terminal device from the subscriber data management network element, where the subscription information indicates that the terminal device has subscribed to the fallback from the second network to the third network to maintain the continuity of the voice service. The mobility management network element sends the capability information to the subscriber data management network element, so that a network element in another domain (for example, an IMS domain) can quickly obtain the capability information from the subscriber data management network element, to improve communication efficiency.

In an embodiment, the sending module 1203 is configured to send the indication information to the access network element when the terminal device supports the capability of falling back from the second network to the third network to maintain the continuity of the voice service and has subscribed to the fallback from the second network to the third network to maintain the continuity of the voice service.

In an embodiment, the mobility management network element initiates the setup of the first bearer after the receiving module 1201 sends the indication information to the access network element or when the mobility management network element sends the indication information to the access network element. Therefore, the setup of the first bearer is initiated only after or when the mobility management network element sends the indication information to the access network element, to ensure that the access network element in the second network can learn that the fallback of the voice service of the terminal device from the second network to the third network is supported.

In an embodiment, the processing module 1202 rejects the setup of the first bearer if determining that the fallback of the voice service of the terminal device from the second network to the third network is not supported.

In another embodiment, the communication apparatus may be configured to perform an operation of the PGW-C in FIG. 4 or an operation of the session management network element in FIG. 5.

For example, the processing module 1202 is configured to: determine that a terminal device is to be handed over from a first network to a second network; and wait until a first moment to send a request message to a mobility management network element in the second network through the sending module 1203, where the request message is used to request to set up a first bearer for a voice service of the terminal device.

In an embodiment, in a scenario in which the terminal device is handed over from the first network to the second network, the session management network element does not immediately request to set up the first bearer for the voice service of the terminal device. The session management network element waits until the first moment to request to set up the first bearer for the voice service of the terminal device. Such a wait enables an access network element in the second network to have a sufficient time period to learn that a fallback of the voice service of the terminal device from the second network to a third network is supported. Therefore, even if the access network element in the second network does not support the voice service, an access network element in the third network with same coverage can process the voice service of the terminal device, to maintain call continuity of the voice service and improve user experience.

In an embodiment, the processing module 1020 is configured to start a timer, and the first moment is a moment at which the timer expires.

For example, the timer is used to wait for the terminal device to complete handover from the first network to the second network.

In an embodiment, the timer is used to wait for the communication apparatus to receive first notification information from the mobility management network element in the second network, where the first notification information indicates that the terminal device is successfully handed over from the first network to the second network.

In an embodiment, the timer is used to wait for the communication apparatus to receive second notification information from a subscriber data management network element, where the second notification information indicates that the terminal device supports a capability of falling back from the second network to the third network to maintain continuity of the voice service.

Therefore, a timer mechanism can ensure that the access network element in the second network has the sufficient time period to learn that the fallback of the voice service of the terminal device from the second network to the third network is supported.

In an embodiment, the first moment is a moment at which the communication apparatus receives first notification information from the mobility management network element in the second network, and the first notification information indicates that the terminal device is successfully handed over from the first network to the second network. Therefore, the mobility management network element in the second network notifies the communication apparatus only after the terminal device is successfully handed over from the first network to the second network, and then the communication apparatus requests to set up the first bearer for the voice service of the terminal device. In a process in which the terminal device is successfully handed over from the first network to the second network, the mobility management network element in the second network has notified the access network element in the second network that the fallback of the voice service of the terminal device from the second network to the third network is supported. Therefore, the access network element in the third network with same coverage can process the voice service of the terminal device, to maintain the call continuity of the voice service and improve user experience.

In an embodiment, the first moment is a moment at which the communication apparatus receives second notification information from a subscriber data management network element, and the second notification information indicates that the terminal device supports a capability of falling back from the second network to the third network to maintain continuity of the voice service. Therefore, the subscriber data management network element notifies the communication apparatus after learning that the terminal device has the capability of maintaining the continuity of the voice service, and then the communication apparatus requests to set up the first bearer for the voice service of the terminal device. Before the subscriber data management network element learns that the terminal device has the capability of maintaining the continuity of the voice service, the mobility management network element in the second network has notified the access network element in the second network that the fallback of the voice service of the terminal device from the second network to the third network is supported. Therefore, the access network element in the third network with same coverage can process the voice service of the terminal device, to maintain the call continuity of the voice service and improve user experience.

In an embodiment, the sending module 1203 is further configured to send a subscription request to the subscriber data management network element, where the subscription request is used to request the subscriber data management network element to send the second notification information to the session management network element after learning, from the mobility management network element in the second network, that the terminal device supports the capability of falling back from the second network to the third network to maintain the continuity of the voice service. For example, the session management network element sends the subscription request to the subscriber data management network element in a session establishment process or in a process in which the session management network element establishes a data transmission channel of the first network for the voice service.

In an embodiment, the processing module 1202 is further configured to trigger establishment of the data transmission channel of the first network for the voice service of the terminal device. The receiving module 1201 is configured to receive a reject message from an access network element in the first network, where the reject message is used to reject the establishment of the data transmission channel for the voice service, the reject message includes first indication information, the first indication information indicates that the access network element initiates handover of the terminal device from the first network to the second network through a first interface, and the first interface is an interface between a mobility management network element in the first network and the mobility management network element in the second network.

In an embodiment, the receiving module 1201 is configured to receive a context request message from a mobility management network element in the first network, where the context request message includes second indication information, and the second indication information indicates to hand over the terminal device from the first network to the second network.

In still another embodiment, the communication apparatus may be configured to perform an operation of the MME in FIG. 4 or an operation of the mobility management network element in the second network in FIG. 6.

For example, the receiving module 1201 is configured to receive capability information from a terminal device, where the capability information indicates that the terminal device supports a capability of falling back from a second network to a third network to maintain continuity of a voice service. The sending module 1203 is configured to send indication information to an access network element in the second network, where the indication information indicates that a fallback of the voice service of the terminal device from the second network to the third network is supported. After sending the indication information, the sending module 1203 is further configured to send first notification information to a session management network element, where the first notification information indicates that the terminal device is successfully handed over from a first network to the second network.

In an embodiment, in a scenario in which the terminal device is handed over from the first network to the second network, the communication apparatus notifies the session management network element only after the terminal device is successfully handed over from the first network to the second network, and then the session management network element requests to set up a first bearer for the voice service of the terminal device. In a process in which the terminal device is successfully handed over from the first network to the second network, the mobility management network element in the second network has notified the access network element in the second network that the fallback of the voice service of the terminal device from the second network to the third network is supported. Therefore, after the access network element in the second network receives a request for setting up the first bearer for the voice service, if not supporting the voice service, the access network element in the second network may hand over the terminal device to an access network element in the third network with same coverage to process the voice service of the terminal device, to maintain call continuity of the voice service and improve user experience.

For example, the indication information is an SRVCC operation possible indication.

In an embodiment, the sending module 1203 is further configured to send the capability information to a subscriber data management network element. The receiving module 1201 is further configured to obtain subscription information of the terminal device from the subscriber data management network element, where the subscription information indicates that the terminal device has subscribed to the fallback from the second network to the third network to maintain the continuity of the voice service.

In an embodiment, the communication apparatus may be configured to perform an operation of the HSS+UDM in FIG. 4 or an operation of the subscriber data management network element in FIG. 7.

For example, the receiving module 1201 is configured to receive capability information of a terminal device from a mobility management network element in a second network, where the capability information indicates that the terminal device supports a capability of falling back from the second network to a third network to maintain continuity of a voice service. The sending module 1203 is configured to send second notification information to a session management network element, where the second notification information indicates that the terminal device supports the capability of falling back from the second network to the third network to maintain the continuity of the voice service, and the session management network element is used for session management in a first network and the second network.

In an embodiment, in a scenario in which the terminal device is handed over from the first network to the second network, the communication apparatus notifies the session management network element after learning that the terminal device has the capability of maintaining the continuity of the voice service, and then the session management network element requests to set up a first bearer for the voice service of the terminal device. Before the communication apparatus learns that the terminal device has the capability of maintaining the continuity of the voice service, the mobility management network element in the second network has notified an access network element in the second network that a fallback of the voice service of the terminal device from the second network to the third network is supported. Therefore, after the access network element in the second network receives a request for setting up the first bearer for the voice service, if not supporting the voice service, the access network element in the second network may hand over the terminal device to an access network element in the third network with same coverage to process the voice service of the terminal device, to maintain call continuity of the voice service and improve user experience.

In an embodiment, the receiving module 1201 is further configured to receive a subscription request from the session management network element, where the subscription request is used to request the subscriber data management network element to send the second notification information to the session management network element after learning, from the mobility management network element in the second network, that the terminal device supports the capability of falling back from the second network to the third network to maintain the continuity of the voice service.

In an embodiment, the communication apparatus may be configured to perform an operation of the AMF in FIG. 8 or an operation of the mobility management network element in the first network in FIG. 9.

For example, the processing module 1202 is configured to determine that a terminal device has a capability of falling back from a second network to a third network to process a voice service. The sending module 1203 is configured to send capability information of the terminal device to a mobility management network element in the second network, where the capability information indicates that the terminal device supports the capability of falling back from the second network to the third network to maintain continuity of the voice service. For example, the mobility management network element in the first network sends the capability information of the terminal device to the mobility management network element in the second network by using a forward relocation request message or a context response message.

In an embodiment, the communication apparatus can determine that the terminal device has the capability of falling back from the second network to the third network to process the voice service, and sends the capability information of the terminal device to the mobility management network element in the second network. Therefore, the mobility management network element in the second network can learn that the terminal device supports the capability of falling back from the second network to the third network to maintain the continuity of the voice service, and may send indication information to an access network element in the second network when or before requesting the access network element in the second network to set up a bearer for the voice service, where the indication information indicates that a fallback of the voice service of the terminal device from the second network to the third network is supported. In this way, even if the access network element in the second network does not support the voice service, after receiving a request for setting up a first bearer for the voice service, the access network element in the second network may hand over the terminal device to an access network element in the third network with same coverage to process the voice service of the terminal device, to maintain call continuity of the voice service and improve user experience.

For example, in an embodiment, the mobility management network element in the first network determines, based on an IMEI of the terminal device, whether the terminal device supports the capability of falling back from the second network to the third network to process the voice service. In an embodiment, in another possible design, the mobility management network element in the first network determines that a voice centric terminal device has the capability of falling back from the second network to the third network to process the voice service.

In an embodiment, the sending module 1203 is further configured to send the capability information to a subscriber data management network element. The mobility management network element sends the capability information to the subscriber data management network element, so that a network element in another domain (for example, an IMS domain) can quickly obtain the capability information from the subscriber data management network element, to improve communication efficiency.

In an embodiment, the receiving module 1201 is further configured to obtain subscription information of the terminal device from the subscriber data management network element, where the subscription information indicates that the terminal device has subscribed to the fallback from the second network to the third network to maintain the continuity of the voice service.

In an embodiment, the sending module 1203 is further configured to send the subscription information to the mobility management network element in the second network. For example, the mobility management network element in the first network sends the subscription information to the mobility management network element in the second network by using the forward relocation request message or the context response message.

In an embodiment, the communication apparatus may be configured to perform an operation of the gNB in FIG. 10 or an operation of the first access network element in the first network in FIG. 11.

For example, the processing module 1202 is configured to configure capability information of a second access network element in a second network, where the capability information indicates whether the second access network element supports a capability for a voice service, and the second access network element is a neighboring access network element of the first access network element. The receiving module 1201 is configured to receive a request message for establishing a transmission channel corresponding to the voice service. The processing module 1202 is further configured to determine, based on the capability information of the second access network element, whether to hand over or redirect a terminal device to the second access network element.

In an embodiment, the communication apparatus can determine, based on the capability information of the second access network element, whether to hand over or redirect the terminal device to the second access network element. In this way, regardless of whether the access network element in the second network supports the voice service, the capability information of the second access network element is considered for handover or redirection, to maintain call continuity of the voice service and improve user experience.

In an embodiment, when the second access network element supports the voice service, the processing module 1202 is configured to hand over or redirect the terminal device to the second access network element. For example, when the second access network element and a third access network element in a third network exist in a co-coverage area of the first access network element, and the second access network element supports the voice service, the first access network element hands over or redirects the terminal device to the second access network element according to a configured preference policy. In this way, the terminal device is preferably handed over or redirected to the second access network element, so that continuity of a data service can be supported while continuity of the voice service is supported, and the data service of the terminal device is not interrupted when the terminal device is handed over to the third network.

In an embodiment, when the second access network element does not support the voice service, if a third access network element in a third network exists in a co-coverage area of the first access network element, and the terminal device supports a fallback from the first network to the third network to maintain continuity of the voice service, the processing module 1202 is configured to hand over or redirect the terminal device to the third access network element, where the third access network element is a neighboring access network element of the second access network element. In this way, even if the access network element in the second network does not support the voice service, the access network element in the third network with same coverage can process the voice service of the terminal device, to maintain the call continuity of the voice service and improve user experience.

Figure 13:
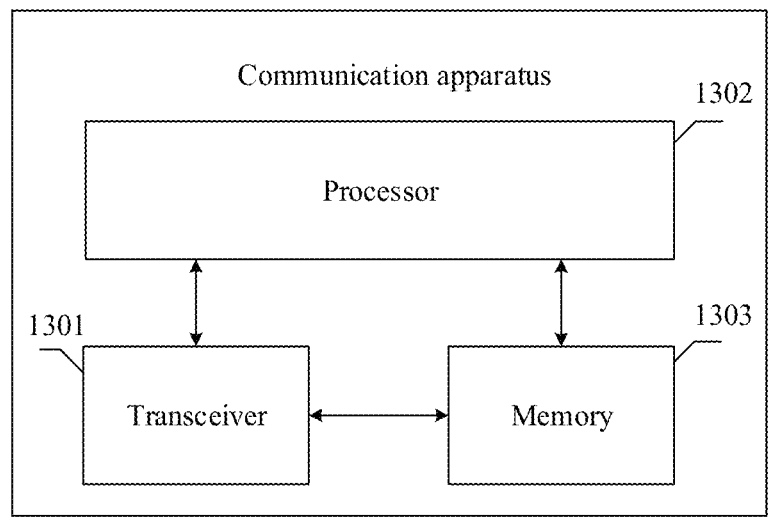

FIG. 13 is a schematic diagram of a structure of a communication apparatus in the foregoing embodiments. The communication apparatus includes a transceiver 1301 and a processor 1302, as shown in FIG. 13. In an embodiment, the processor 1302 is configured to perform a corresponding function of the session management network element, the mobility management network element, the subscriber data management network element, or the access network element in the foregoing methods. The transceiver 1301 is configured to implement communication between the communication apparatus and another network element. The data forwarding apparatus may further include a memory 1303. The memory 1303 is configured to be coupled to the processor, and stores program instructions and data that are necessary for the data forwarding apparatus.

The memory 1303 may store program instructions for triggering the processor 1302 to perform the foregoing function. The processor 1302 invokes the program instructions in the memory 1303 to perform the foregoing function. In an embodiment, a computer-readable storage medium stores program instructions for triggering the processor 1302 to perform the foregoing function. The processor 1302 invokes the program instructions in the computer-readable storage medium to perform the foregoing function. The computer-readable storage medium also falls within the protection scope of the present disclosure.

It may be understood that FIG. 13 shows only a simplified design of the foregoing device. During actual application, each of the foregoing devices may include any quantity of transmitters, receivers, processors, controllers, memories, communication units, or the like, and all devices that can implement this application fall within the protection scope of this application.

The controller/processor configured to perform the function of foregoing session management function network element in this application may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various examples of logical blocks, modules, and circuits described with reference to content disclosed in this application. The processor may alternatively be a combination of processors implementing a computing function, for example, a combination of one or more microprocessors, or a combination of the DSP and a microprocessor.

Method or algorithm steps described in combination with the content disclosed in this application may be implemented by hardware, or may be implemented by a processor by executing software instructions. The software instructions may include a corresponding software module. The software module may be stored in a RAM, a flash memory, a ROM, an EPROM, an EEPROM, a register, a hard disk, a removable hard disk, a CD-ROM, or a storage medium in any other form well-known in the art. For example, a storage medium is coupled to the processor, so that the processor can read information from the storage medium and write information into the storage medium. Certainly, the storage medium may alternatively be a component of the processor. The processor and the storage medium may be located in an ASIC. In addition, the ASIC may be located in the session management function network element. Certainly, the processor and the storage medium may alternatively exist in the session management function network element as discrete components.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to embodiments of the present disclosure are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing description is merely implementations of the present disclosure, but is not intended to limit the protection scope of the present disclosure. Any variation or replacement readily figured out by One of ordinary skilled in the art within the technical scope disclosed in the present disclosure shall fall within the protection scope of the present disclosure. Therefore, the protection scope of the present disclosure shall be subject to the protection scope of the claims.

What is claimed is:

1. A communication apparatus for a voice service, comprising:
   a processor,
   a communication interface, and
   a memory coupled to the processor to store instructions, which when executed by the processor, cause the communication apparatus to:
   determine that a terminal device is to be handed over from a first network to a second network, and wait until a first moment; and
   send a request message to a mobility management network element in the second network after the first moment, wherein the request message is used to request to set up a first bearer for the voice service of the terminal device, wherein the first moment is a moment at which a transceiver receives second notification information from a subscriber data management network element, and wherein the second notification information indicates that the terminal device supports a capability of falling back from the second network to a third network to maintain continuity of the voice service.

2. The apparatus according to claim 1, wherein the processor is further configured to execute the instructions in the memory to cause the communication apparatus to:
   start a timer to wait until the first moment at which the timer expires.

3. The apparatus according to claim 2, wherein
   the timer is used to wait for the terminal device to complete handover from the first network to the second network.

4. The apparatus according to claim 2, wherein the timer is used to wait for a transceiver to receive first notification information from the mobility management network element in the second network, wherein the first notification information indicates that the terminal device is successfully handed over from the first network to the second network.

5. The apparatus according to claim 2, wherein the timer is used to wait for a transceiver to receive the second notification information from the subscriber data management network element.

6. The apparatus according to claim 1, wherein the processor is further configured to execute the instructions in the memory to cause the communication apparatus to:
   send a subscription request to the subscriber data management network element to request the subscriber data management network element to send the subscriber notification information to a session management network element after learning, from the mobility management network element in the second network, that the terminal device supports the capability of falling back from the second network to the third network to maintain the continuity of the voice service, and wherein the session management network element is used for session management in the first network and the second network.

7. The apparatus according to claim 6, wherein the processor is further configured to execute the instructions in the memory to cause the communication apparatus to:
   send the subscription request to the subscriber data management network element in a session establishment process.

8. The apparatus according to claim 6, wherein the processor is further configured to execute the instructions in the memory to cause the communication apparatus to:
   send the subscription request to the subscriber data management network element in a process of establishing a data transmission channel of the first network for the voice service.

9. The apparatus according to claim 1, wherein the processor is further configured to execute the instructions in the memory to cause the communication apparatus to:
   trigger establishment of a data transmission channel of the first network for the voice service of the terminal device; and
   receive a reject message from an access network element in the first network, wherein the reject message is used to reject the establishment of the data transmission channel for the voice service, wherein the reject message comprises first indication information indicating that the access network element initiates handover of the terminal device from the first network to the second network through a first interface between a mobility management network element in the first network and the mobility management network element in the second network.

10. The apparatus according to claim 1, wherein the processor is further configured to execute the instructions in the memory to cause the communication apparatus to:
   receive a context request message from a mobility management network element in the first network, wherein the context request message comprises second indication information indicating to hand over the terminal device from the first network to the second network.

11. A method for a voice service, comprising:
   determining, by a session management network element, that a terminal device is to be handed over from a first network to a second network, wherein the session management network element is used for session management in the first network and the second network;

waiting, by the session management network element, until a first moment; and sending, by the session management network element, a request message to a mobility management network element in the second network after the first moment, wherein the request message is used to request to set up a first bearer for the voice service of the terminal device, wherein the first moment is a moment at which the session management network element receives second notification information from a subscriber data management network element, and wherein the second notification information indicates that the terminal device supports a capability of falling back from the second network to a third network to maintain continuity of the voice service.

12. The method according to claim 11, further comprising:

starting, by the session management network element, a timer to wait until the first moment at which the timer expires.

13. The method according to claim 12, wherein the timer is used to wait for the session management network element to receive the second notification information from the subscriber data management network element.

14. A system for a voice service, comprising: a session management network element and a subscriber data management network element, wherein the subscriber data management network element is configured to: receive capability information of a terminal device from a mobility management network element in a second network, wherein the capability information indicates that the terminal device supports a capability of falling back from the second network to a third network to maintain continuity of the voice service; and send second notification information to the session management network element, wherein the second notification information indicates that the terminal device supports the capability of falling back from the second network to the third network to maintain the continuity of the voice service, and the session management network element is used for session management in a first network and the second network; and the session management network element is configured to: determine that the terminal device is to be handed over from the first network to the second network, and wait until a first moment; and send a request message to the mobility management network element in the second network after the first moment, wherein the request message is used to request to set up a first bearer for the voice service of the terminal device; wherein the first moment is a moment at which the session management network element receives the second notification information.

15. The system according to claim 14, wherein the session management network element is further configured to:

start a timer to wait until the first moment at which the timer expires.

16. The system according to claim 15, wherein the timer is used to wait for the session management network element to receive the second notification information from the subscriber data management network element.

17. The system according to claim 14, wherein the session management network element is further configured to send a subscription request to the subscriber data management network element, wherein the subscription request is used to request the subscriber data management network element to send the second notification information to the session management network element after learning, from the mobility management network element in the second network, that the terminal device supports the capability of falling back from the second network to the third network to maintain the continuity of the voice service; and the subscriber data management network element is configured to receive the subscription request.

* * * * *